(12) United States Patent
Mao et al.

(10) Patent No.: US 11,333,642 B2
(45) Date of Patent: *May 17, 2022

(54) METHODS AND SYSTEMS FOR CHROMATOGRAPHY DATA ANALYSIS

(71) Applicant: Regeneron Pharmaceuticals, Inc., Tarrytown, NY (US)

(72) Inventors: Nathan L. Mao, Cohoes, NY (US); Eric Shierly, Castleton-on-Hudson, NY (US); Bernhard Schilling, Hudson, NY (US); Scott Carver, Wynantskill, NY (US); Stefanie McDermott, Sleepy Hollow, NY (US); John Mattila, Nyack, NY (US); Hanne Bak, New York, NY (US)

(73) Assignee: Regeneran Pharmaceuticals, Inc., Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,548

(22) Filed: Feb. 21, 2020

(65) Prior Publication Data
US 2020/0191756 A1    Jun. 18, 2020

Related U.S. Application Data

(63) Continuation of application No. 15/793,388, filed on Oct. 25, 2017, now Pat. No. 10,613,063.
(Continued)

(51) Int. Cl.
*G01N 30/88*    (2006.01)
*G01N 30/86*    (2006.01)

(52) U.S. Cl.
CPC ......... *G01N 30/88* (2013.01); *G01N 30/8617* (2013.01); *G01N 30/8693* (2013.01); *G01N 2030/889* (2013.01)

(58) Field of Classification Search
CPC .............. G01N 30/88; G01N 30/8617; G01N 30/8693; G01N 2030/889; G01N 30/8093; G01N 30/7233; G01N 3030/889
See application file for complete search history.

(56) References Cited

U.S. PATENT DOCUMENTS

| | | |
|---|---|---|
| 4,801,726 A | 1/1989 | Giese et al. |
| 4,937,188 A | 6/1990 | Giese et al. |

(Continued)

FOREIGN PATENT DOCUMENTS

| | | |
|---|---|---|
| WO | 9625425 A1 | 8/1996 |
| WO | 2007110339 A1 | 10/2007 |

(Continued)

OTHER PUBLICATIONS

Christopher Bork et al.: "Online integrity monitoring in the Protein A step of mAb Production Processing-increasing reliability and process robustness", Biotechnology Progress., vol. 30, No. 2, Jan. 13, 2014, pp. 383-390.

(Continued)

*Primary Examiner* — Bryan Bui
(74) *Attorney, Agent, or Firm* — Bookoff McAndrews, PLLC

(57) ABSTRACT

Embodiments of the present disclosure are directed to methods and systems for assessing integrity of chromatography columns, systems, and processes. The methods and systems can comprise one or more of extracting a block and signal combination for analysis, performing a transition analysis, performing one or more statistical process controls, and/or implementing in-process controls based on the statistical process controls.

20 Claims, 25 Drawing Sheets

Related U.S. Application Data

(60) Provisional application No. 62/412,563, filed on Oct. 25, 2016.

(56) References Cited

U.S. PATENT DOCUMENTS

| | | |
|---|---|---|
| 5,190,864 A | 3/1993 | Giese et al. |
| 5,412,083 A | 5/1995 | Giese et al. |
| 5,641,870 A | 6/1997 | Rinderknecht et al. |
| 6,066,719 A | 5/2000 | Zapata |
| 6,214,984 B1 | 4/2001 | Zapata |
| 6,441,160 B2 | 8/2002 | Kitamura et al. |
| 7,038,017 B2 | 5/2006 | Rinderknecht et al. |
| 7,070,959 B1 | 7/2006 | Papadopoulos et al. |
| 7,101,982 B2 | 9/2006 | Ghose et al. |
| 7,220,356 B2 | 5/2007 | Thommes et al. |
| 7,303,746 B2 | 12/2007 | Wiegand et al. |
| 7,303,747 B2 | 12/2007 | Wiegand et al. |
| 7,306,799 B2 | 12/2007 | Wiegand et al. |
| RE40,070 E | 2/2008 | Shadle et al. |
| 7,374,757 B2 | 5/2008 | Papadopoulos et al. |
| 7,374,758 B2 | 5/2008 | Papadopoulos et al. |
| 7,385,040 B2 | 6/2008 | Johansson et al. |
| 7,393,631 B2 | 7/2008 | Cannon-Carlson et al. |
| 7,427,659 B2 | 9/2008 | Shukla et al. |
| 7,531,173 B2 | 5/2009 | Wiegand et al. |
| 7,608,261 B2 | 10/2009 | Furfine et al. |
| 7,666,413 B2 | 2/2010 | Liu et al. |
| 7,700,097 B2 | 4/2010 | Braslawsky et al. |
| 7,714,112 B2 | 5/2010 | Engstrand et al. |
| 7,750,129 B2 | 7/2010 | Johansson et al. |
| RE41,555 E | 8/2010 | Shadle et al. |
| RE41,595 E | 8/2010 | Shandle et al. |
| 7,795,405 B2 | 9/2010 | DiNovo |
| 7,863,426 B2 | 1/2011 | Wan et al. |
| 7,972,598 B2 | 7/2011 | Daly et al. |
| 8,003,364 B2 | 8/2011 | Post Hansen et al. |
| 8,012,754 B2 | 9/2011 | Rinderknecht et al. |
| 8,029,791 B2 | 10/2011 | Papadopoulos et al. |
| 8,084,032 B2 | 12/2011 | Yumioka et al. |
| 8,092,803 B2 | 1/2012 | Furfine et al. |
| 8,163,531 B2 | 4/2012 | Post Hansen et al. |
| 8,231,876 B2 | 7/2012 | Wan et al. |
| 8,343,349 B2 | 1/2013 | Eriksson et al. |
| 8,343,737 B2 | 1/2013 | Papadopoulos et al. |
| 8,410,928 B2 * | 4/2013 | Ganguly ............ G01N 30/8693 340/540 |
| 8,435,527 B2 | 5/2013 | Yumioka et al. |
| 8,470,328 B2 | 6/2013 | Yumioka et al. |
| 8,470,578 B2 | 6/2013 | Post Hansen et al. |
| 8,491,904 B2 | 7/2013 | Hickman |
| 8,568,586 B2 * | 10/2013 | Cunnien ................ G01N 30/88 210/198.2 |
| 8,603,473 B2 | 12/2013 | Glaser et al. |
| 8,608,960 B2 | 12/2013 | Thommes et al. |
| 8,647,842 B2 | 2/2014 | Papadopoulos et al. |
| 8,821,865 B2 | 9/2014 | Neu et al. |
| 8,821,879 B2 | 9/2014 | Babuka et al. |
| 8,871,209 B2 | 10/2014 | Stitt et al. |
| 8,895,709 B2 | 11/2014 | Hickman et al. |
| 8,895,710 B2 | 11/2014 | Engstrand et al. |
| 8,946,395 B1 | 2/2015 | Herigstad et al. |
| 8,969,532 B2 | 3/2015 | DeFrees et al. |
| 9,017,687 B1 | 4/2015 | Wang et al. |
| 9,018,361 B2 | 4/2015 | Hickman et al. |
| 9,067,990 B2 | 6/2015 | Wang et al. |
| 9,102,723 B2 | 8/2015 | Wan et al. |
| 9,109,010 B2 | 8/2015 | Hickman et al. |
| 9,109,201 B2 | 8/2015 | Post Hansen et al. |
| 9,150,645 B2 | 10/2015 | Subramanian et al. |
| 9,150,938 B2 | 10/2015 | Oroskar |
| 9,181,572 B2 | 11/2015 | Subramanian et al. |
| 9,193,787 B2 | 11/2015 | Chumsae |
| 9,249,182 B2 | 2/2016 | Herigstad et al. |
| 9,266,950 B2 | 2/2016 | Hickman |
| 9,334,319 B2 | 5/2016 | Ramasubramanyan et al. |
| 9,346,879 B2 | 5/2016 | Ramasubramanyan et al. |
| 9,359,434 B2 | 6/2016 | Subramanian et al. |
| 9,488,625 B2 | 11/2016 | Felgenhauer et al. |
| 9,505,833 B2 | 11/2016 | Chumsae |
| 9,518,082 B2 | 12/2016 | Allison et al. |
| 9,650,411 B2 | 5/2017 | Ishihara |
| 9,650,412 B2 | 5/2017 | Konstantinov et al. |
| 9,650,413 B2 | 5/2017 | Konstantinov et al. |
| 9,657,056 B2 | 5/2017 | Konstantinov et al. |
| 9,683,012 B2 | 6/2017 | Yoon et al. |
| 9,683,033 B2 | 6/2017 | Subramanian et al. |
| 9,688,752 B2 | 6/2017 | Wang et al. |
| 9,708,365 B2 | 7/2017 | Mendiratta et al. |
| 9,708,399 B2 | 7/2017 | Wang et al. |
| 9,708,400 B2 | 7/2017 | Subramanian et al. |
| 9,766,217 B2 | 9/2017 | Kidal et al. |
| 9,878,266 B2 | 1/2018 | Engstrand et al. |
| 9,920,120 B2 | 3/2018 | Yu et al. |
| 9,945,858 B2 | 4/2018 | Gunawan et al. |
| 9,957,318 B2 | 5/2018 | Ramasubramanyan et al. |
| 9,975,948 B2 | 5/2018 | Hickman |
| 9,994,609 B2 | 6/2018 | Ghose et al. |
| 10,017,746 B2 | 7/2018 | Sheldon et al. |
| 10,023,608 B1 | 7/2018 | Ma et al. |
| 10,053,489 B2 | 8/2018 | Kim et al. |
| 10,115,576 B2 * | 10/2018 | Geromanos ........ G01N 30/8631 |
| 10,188,732 B2 | 1/2019 | Conley et al. |
| 10,342,876 B2 | 7/2019 | Bak et al. |
| 10,353,868 B2 * | 7/2019 | Rudge ................ G06F 11/3089 |
| 10,363,496 B2 | 7/2019 | Coutard |
| 10,494,429 B2 | 12/2019 | Yu et al. |
| 10,533,045 B2 | 1/2020 | Allison et al. |
| 10,597,443 B2 | 3/2020 | Schurpf et al. |
| 10,597,446 B2 | 3/2020 | Yu et al. |
| 10,597,447 B2 | 3/2020 | Yu et al. |
| 10,613,063 B2 * | 4/2020 | Mao ................ G01N 30/8617 |
| 10,626,376 B2 | 4/2020 | McNally et al. |
| 10,692,709 B2 | 6/2020 | Geromanos et al. |
| 10,696,735 B2 | 6/2020 | Yonan et al. |
| 10,696,952 B2 | 6/2020 | Sheldon et al. |
| 10,702,603 B2 | 7/2020 | Conley et al. |
| 10,788,494 B2 | 9/2020 | Gunawan et al. |
| 10,822,404 B2 | 11/2020 | Yu et al. |
| 10,894,079 B2 | 1/2021 | Mullner et al. |
| 10,940,401 B2 | 3/2021 | Mahajan et al. |
| 10,947,262 B2 | 3/2021 | Gronke et al. |
| 2002/0064860 A1 | 5/2002 | Cannon-Carlson et al. |
| 2004/0106184 A1 | 6/2004 | Senesac |
| 2005/0163782 A1 | 7/2005 | Glaser et al. |
| 2006/0027454 A1 | 2/2006 | DiNovo |
| 2006/0257972 A1 | 11/2006 | Ishihara |
| 2007/0213513 A1 | 9/2007 | Van Alstine et al. |
| 2008/0299545 A1 | 12/2008 | Zhang et al. |
| 2008/0299671 A1 | 12/2008 | Glad et al. |
| 2010/0035299 A1 | 2/2010 | DeFrees et al. |
| 2010/0069617 A1 | 3/2010 | Gagnon |
| 2010/0127860 A1 | 5/2010 | Ganguly et al. |
| 2010/0136025 A1 | 6/2010 | Hickman et al. |
| 2010/0278822 A1 | 11/2010 | Fraunhofer et al. |
| 2011/0147312 A1 | 6/2011 | Cunnien et al. |
| 2013/0131318 A1 | 5/2013 | Kremer et al. |
| 2013/0149310 A1 | 6/2013 | Jasson et al. |
| 2013/0336957 A1 | 12/2013 | Wang et al. |
| 2014/0010820 A1 | 1/2014 | Wang et al. |
| 2014/0046038 A1 | 2/2014 | Ishihara |
| 2014/0072585 A1 | 3/2014 | Herigstad et al. |
| 2014/0154270 A1 | 6/2014 | Wang et al. |
| 2014/0302053 A1 | 10/2014 | Huang et al. |
| 2014/0356370 A1 | 12/2014 | Swergold et al. |
| 2014/0356371 A1 | 12/2014 | Swergold et al. |
| 2014/0356372 A1 | 12/2014 | Stahl et al. |
| 2015/0170892 A1 | 6/2015 | Geromanos et al. |
| 2015/0210735 A1 | 7/2015 | Hickman et al. |
| 2015/0299249 A1 | 10/2015 | Herigstad et al. |
| 2015/0337029 A1 | 11/2015 | Kyratsous et al. |
| 2016/0083452 A1 | 3/2016 | Hickman et al. |
| 2016/0101181 A1 | 4/2016 | Bak et al. |
| 2016/0115193 A1 | 4/2016 | Herigstad et al. |

(56) References Cited

U.S. PATENT DOCUMENTS

| | | |
|---|---|---|
| 2016/0152717 A1 | 6/2016 | Cao et al. |
| 2016/0215040 A1 | 7/2016 | Kyratsous et al. |
| 2016/0251441 A1 | 9/2016 | O'Connor et al. |
| 2016/0320391 A1 | 11/2016 | Gunawan et al. |
| 2017/0101472 A1 | 4/2017 | Ullman et al. |
| 2017/0158760 A1 | 6/2017 | Hickman et al. |
| 2017/0174779 A1 | 6/2017 | Varghese et al. |
| 2017/0174781 A1 | 6/2017 | Brownstein |
| 2017/0342145 A1 | 11/2017 | Wang et al. |
| 2017/0349654 A1 | 12/2017 | Wang et al. |
| 2018/0222938 A1 | 8/2018 | Herigstad et al. |
| 2018/0230210 A1 | 8/2018 | Hickman |
| 2019/0062419 A1 | 2/2019 | Ramasubramanyan et al. |
| 2019/0144495 A1 | 5/2019 | Ghose et al. |
| 2019/0248823 A1 | 8/2019 | Gronke et al. |
| 2019/0298829 A1 | 10/2019 | Wan et al. |
| 2020/0002373 A1 | 1/2020 | Livigini et al. |
| 2020/0223913 A1 | 7/2020 | Allison et al. |
| 2021/0009632 A1 | 1/2021 | Tan et al. |
| 2021/0010055 A1 | 1/2021 | Cura et al. |

FOREIGN PATENT DOCUMENTS

| | | |
|---|---|---|
| WO | 2009058769 A1 | 5/2009 |
| WO | 2009/094203 A2 | 7/2009 |
| WO | WO 2010/019814 A1 | 2/2010 |
| WO | 2011028961 A2 | 3/2011 |
| WO | 2011098526 A1 | 8/2011 |
| WO | 2012030512 A1 | 3/2012 |
| WO | 2012065072 A2 | 5/2012 |
| WO | 2013066707 A1 | 5/2013 |
| WO | 2013078170 A1 | 5/2013 |
| WO | 2013176754 A1 | 11/2013 |
| WO | 2013177115 A2 | 11/2013 |
| WO | 2013177118 A2 | 11/2013 |
| WO | 2014100143 A2 | 6/2014 |
| WO | 2014143185 A1 | 9/2014 |
| WO | 2014158231 A1 | 10/2014 |
| WO | 2015035180 A1 | 3/2015 |
| WO | 2015038888 A1 | 3/2015 |
| WO | 2017140881 A1 | 8/2017 |
| WO | 2018027195 A1 | 2/2018 |
| WO | 2019040671 A1 | 2/2019 |
| WO | 2019178495 A1 | 9/2019 |
| WO | 2019246153 A1 | 12/2019 |
| WO | 2020023566 A1 | 1/2020 |
| WO | 2020037016 A1 | 2/2020 |
| WO | 2020096958 A1 | 5/2020 |
| WO | 2020172658 A1 | 8/2020 |
| WO | 2020205469 A1 | 10/2020 |
| WO | 2020264411 A1 | 12/2020 |

OTHER PUBLICATIONS

Larson et al., Use of Process Data to Assess Chromatographic Performance in Production-Scale Protein Purification Columns, Biotechnol. Prog., 2003, 19, 485-492.

International Search Report for International Application No. PCT/US2017/058190 dated Jan. 25, 2018 (6 pages).

* cited by examiner

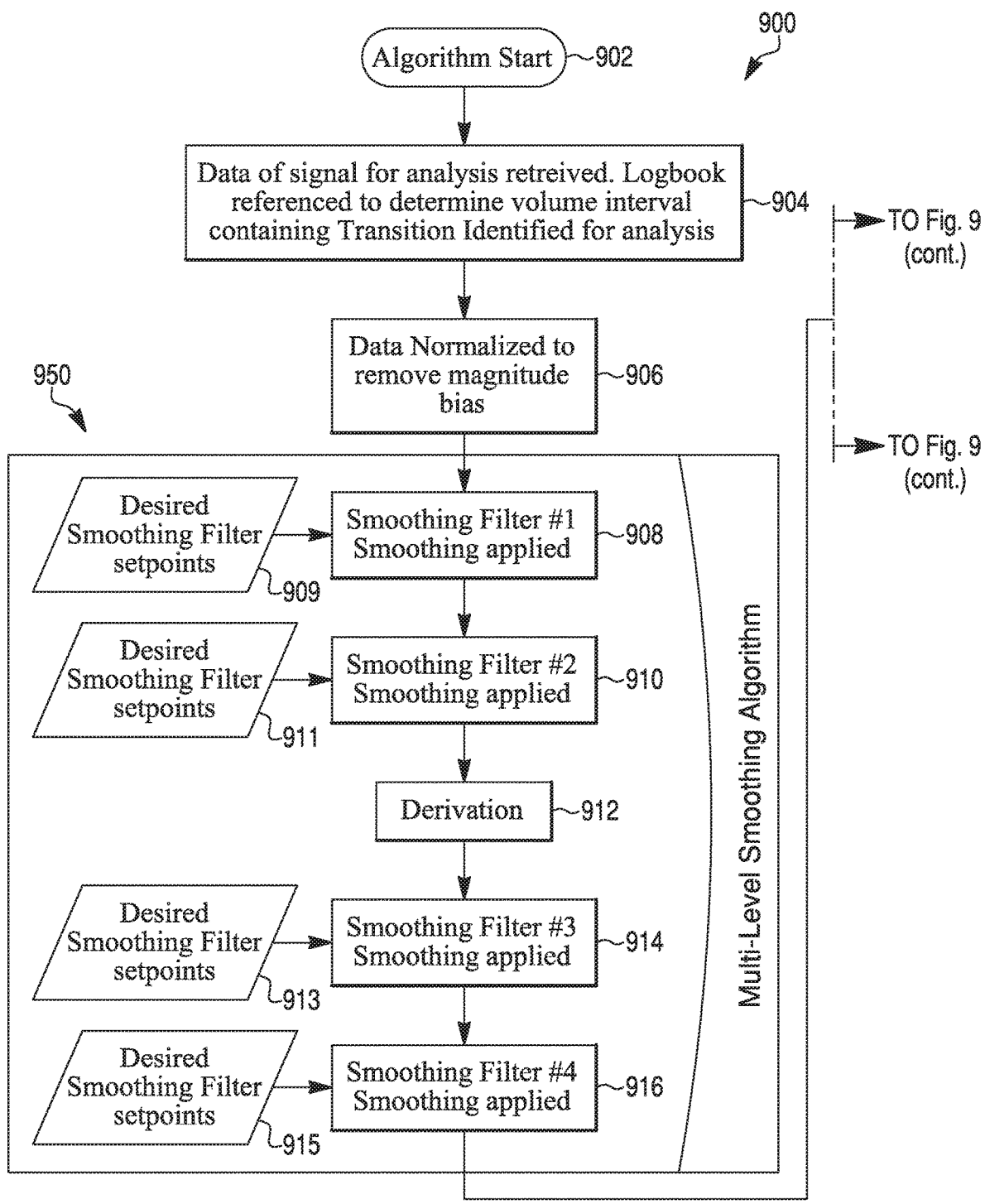

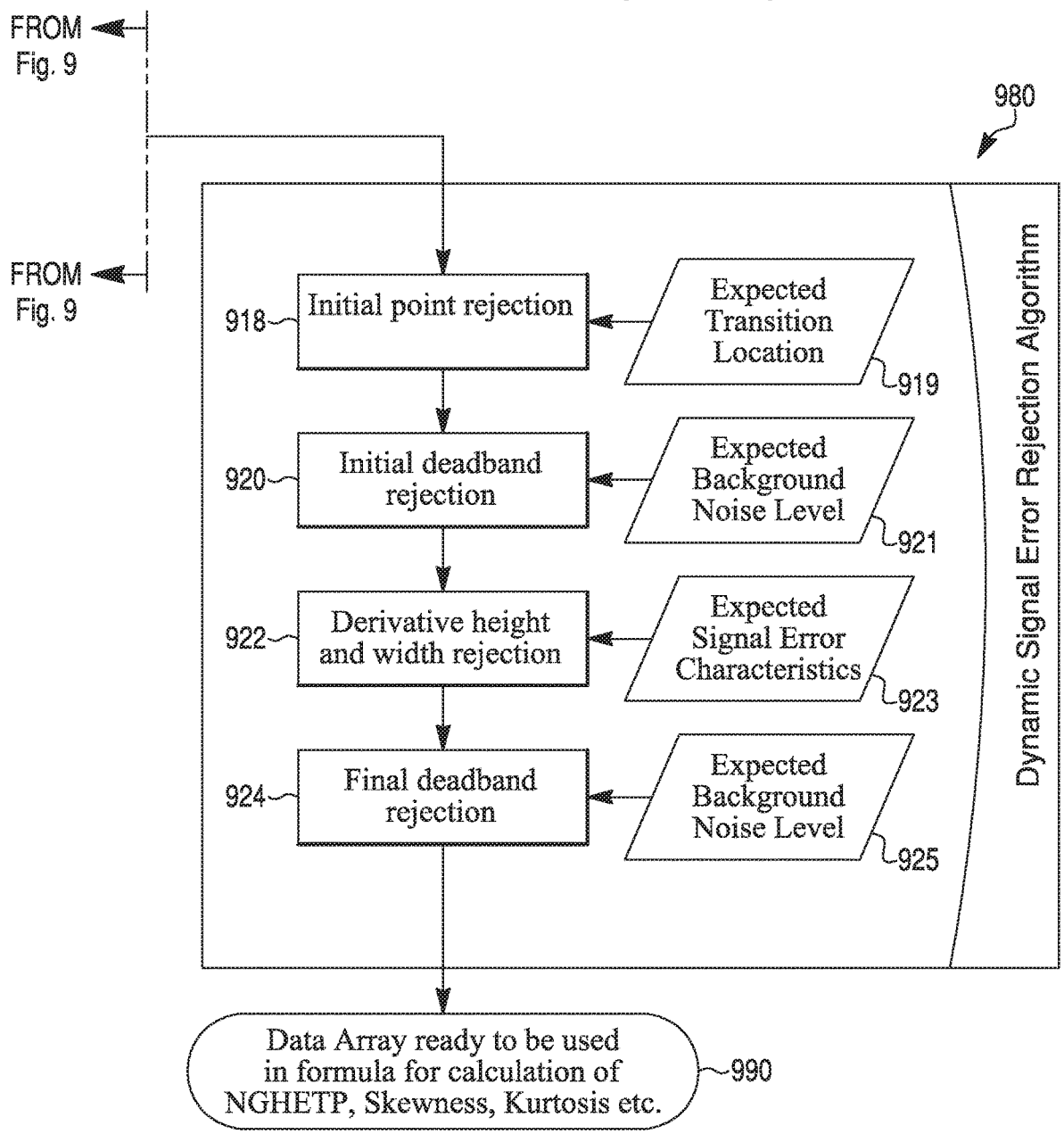

FIG. 23

Profile TA Location - Create

Administration ▼    Connection Set Up ▼    Data Lookup ▼    Smith, John ▼

| Name | Profile 1 |
|---|---|
| Comments | Created per Report 100:1 on 11Oct2016 |
| Historical Data/TA Location | Test Location |
| File Pattern | 803340 |
| Final Value | End Block |
| Key Indicator | Block Equilibration |
| Hard Reset | 0.7 |
| Window size for Moving Average | 0 |

First SG Filter

| 0 | 1 | 2 | 3 | 4 | 5 | 6 | 7 | 8 | 9 | 10 | 11 | 12 | 13 |
|---|---|---|---|---|---|---|---|---|---|---|---|---|---|
| 226 | 269 | 264 | 249 | 224 | 189 | 144 | 89 | 24 | -51 | -138 | 0 | 0 | 0 |

Second SG Filter

| 0 | 1 | 2 | 3 | 4 | 5 | 6 | 7 | 8 | 9 | 10 | 11 | 12 | 13 |
|---|---|---|---|---|---|---|---|---|---|---|---|---|---|
| 143 | 26 | 24 | 21 | 18 | 9 | 0 | -11 | 0 | 0 | 0 | 0 | 0 | 0 |

| Percentage of V max first under which signal is zero | 0.02 |
|---|---|
| Percentage of max width to retain peak | 0.4 |
| Percentage of V max first to retain containing peak | 0.1 |
| Height of chromatography column | 20 |
| Start Date | 10/11/2016 |
| End Date | 10/31/2017 |
| DB Name | Default |

Save | Save & Generate | Cancel

Report Pivot Table

| Lot & Cycle Number | Method run at | Non gaussian HETP | Gaussian HETP | Skewness | Asymmetry | Kurtosis | Non Gaussian N | Gaussian N | Snapshot |
|---|---|---|---|---|---|---|---|---|---|
| 8034000069_1 | 26 February 2015 08:04 AM | 0.09634 | 0.12754 | 0.42478 | 1.46134 | 2.70278 | 207.60325 | 156.81065 | SKID:EU:8034000069Cycle1001::10_LogbookKeyword"Block ReEquil"Final Value: "End Block" |
| 8034000069_2 | 26 February 2015 10:13 AM | 0.10199 | 0.12346 | 0.50936 | 1.41636 | 2.95905 | 196.09741 | 161.99133 | SKID:EU:8034000069Cycle2001::10_LogbookKeyword"Block ReEquil"Final Value: "End Block" |
| 8034000069_3 | 26 February 2015 12:16 PM | 0.0984 | 0.11892 | 0.43977 | 1.4487 | 2.75546 | 203.24894 | 168.1838 | SKID:EU:8034000069Cycle3001::10_LogbookKeyword"Block ReEquil"Final Value: "End Block" |
| 8034000069_4 | 26 February 2015 02:16 PM | 0.1 | 0.12603 | 0.52262 | 1.68733 | 3.03362 | 200.00508 | 158.69742 | SKID:EU:8034000069Cycle4001::10_LogbookKeyword"Block ReEquil"Final Value: "End Block" |

Administration ▾   Connection Set Up ▾   Data Lookup ▾     Smith, John ▾

Report created on 06/28/16

2400

METHODS AND SYSTEMS FOR CHROMATOGRAPHY DATA ANALYSIS

CROSS-REFERENCE TO RELATED APPLICATIONS

This application is a continuation of U.S. patent application Ser. No. 15/793,388, filed Oct. 25, 2017, which claims priority to U.S. Provisional Patent Application No. 62/412,563 filed Oct. 25, 2016, both of which are herein incorporated by reference in their entireties.

TECHNICAL FIELD

Aspects of the present disclosure relate generally to chromatography systems and methods, and, specifically, to embodiments of methods and systems for chromatography data analysis, e.g., for in-process monitoring and control of chromatography systems.

BACKGROUND

Packed bed chromatography processes play an important role in the production of biologic drug products. Many active biologics, such as proteins, are purified for use in drug products using packed bed chromatography. Chromatography column operation therefore may have a significant effect on manufacturing critical process parameters (CPP) and critical quality attributes (CQA). Moreover, the complexity and size of biologics, as compared to, e.g., small molecules, can make analyzing biologic quality and purity relatively more difficult. Thus, monitoring the quality, consistency, and integrity of chromatography processes and equipment via in-process controls is important to ensure that product quality meets any applicable standards (e.g., government regulations).

Generally, column integrity can be determined by the uniform plug flow of a mobile phase through a column's stationary phase (e.g., resin). Examples of loss of column integrity can include, for example, evidence of channeling, headspace, fouled areas of flow, and the like. Channeling may result when, among other things, a mobile phase is able to travel some distance from a column inlet towards the column's outlet without contacting the stationary phase. Headspace may refer to, among other things, when a lateral zone is created in a column that allows for non-plug flow of the mobile phase. Fouled areas of flow may include dirt or other residue on inlet or outlet frit surfaces, or on resin pores.

Several techniques exist for monitoring chromatography column performance and integrity. Some techniques, such as the pulse injection method for measuring height equivalent of a theoretical plate (HETP), require buffer solutions needing special preparation. Pulse injection techniques generally require operation of chromatography equipment and the column outside of normal processes, resulting in increased process time and labor. Other techniques include monitoring critical parameters (e.g., step yield, pre-pool volume, and maximum optical density during load) as a part of routine production. However, setting alarm limits on these parameters is difficult and imprecise, and may result in false alarms or overly broad limits.

There exists a need for methods, systems, and processes for measuring and managing column performance and integrity with accuracy and precision, and with minimal disruption to processes. Moreover, because of inherent differences between chromatography columns, chromatography column cycles, and/or production lots for any given product undergoing chromatography, there exists a need for methods, systems, and processes with which to customize analyses of column performance and integrity for a particular column or columns, a particular cycle or cycles, and/or a particular lot or lots of a product. Finally, there exists a need for precise in-process controls that use such analyses, and for methods and systems for responding to deviations from such controls, so that issues with column integrity and performance may be identified and corrected early, with minimal waste and expense.

SUMMARY

Embodiments of the present disclosure may be directed to a process control method, the method including: receiving raw chromatography data including a plurality of signals, wherein each signal of the plurality of signals is associated with one of a plurality of blocks; obtaining a subset of data by selecting a combination of a first block and a first signal from the raw chromatography data; generating processed chromatography data by applying a noise reduction technique to the subset of data; generating transition data by performing a transition analysis on the processed chromatography data; and performing an action based on the transition data.

In some embodiments, the method may further include performing a chromatography column run, wherein the raw chromatography data may be received from the chromatography column run. In other embodiments, the raw chromatography data may be received from a chromatography process skid. In still further embodiments, each block of the plurality of blocks may correspond to a step in a chromatography process. In further embodiments, the selected combination may include the first block, the first signal, and a second signal of the plurality of signals.

In still further embodiments, the method may also include selecting the combination of the first block and the first signal according to a profile defining a plurality of selection criteria. In some embodiments, the plurality of selection criteria may include: whether blocks occur at regular chromatography cycle intervals; an extent to which one of the plurality of signals saturates a detector; an extent to which the plurality of signals approaches a stationary phase at a distinct level; a magnitude of variation in the plurality of signals; and/or a number of inflection points shown by the plurality of signals during a transition phase.

In some embodiments, selecting the combination of the first block and the first signal may include selecting a primary block and signal combination, and the method further may include selecting a secondary block and signal combination. In further embodiments, the noise reduction technique may include: selecting a portion of the subset of data to analyze using predetermined set points; normalizing the portion to prevent magnitude bias; using at least one smoothing filter on the portion to generate smoothed data; and analyzing the portion for dynamic signal errors. In yet further embodiments, the method further may include: selecting smoothed data matching a feature of a chromatogram transition, wherein the feature includes one of: derivative duration; maximum intensity; duration from initiation; or expected background sensor noise. In still further embodiments, the transition analysis may include generating a curve using the processed chromatography data, and analyzing the curve to generate performance parameters.

In some embodiments, the method may further include generating an Individual chart, a Moving Range chart, or a Range chart based on the transition data, and generating performance data by applying a statistical process control to the Individual chart, Moving Range chart, or Range chart, wherein performing the action based on the transition data may include performing the action based on the performance data. In some embodiments, applying a statistical process control may include performing one of a multivariate data analysis or a principal component analysis. In some embodiments, performing an action based on the performance data may include generating a notification of an event, generating an evaluation of the event, or generating a deviation notification form. Some embodiments of the present disclosure may include a chromatography method that includes performing the process control method while running a chromatography column.

Some aspects of the present disclosure may relate to a process control method, the method including: receiving a selection of raw chromatography data; generating smoothed data by applying a noise reduction technique to the selection of raw chromatography data, generating processed chromatography data by selecting smoothed data matching a feature of a chromatogram transition, and performing an action based on the processed chromatography data. The noise reduction technique may include selecting a portion of the smoothed data to analyze using predetermined set points, normalizing the portion of data to prevent magnitude bias, using at least one smoothing filter on the portion of data to generate smoothed data, and analyzing the portion of data for dynamic signal errors.

In some embodiments, receiving the selection of raw chromatography data may include receiving raw chromatography data including a plurality of signals and a plurality of blocks, wherein each signal of the plurality of signals may be associated with a block, and selecting a combination of a first block and a first signal from the raw chromatography data.

In some embodiments, the method further may include using the processed chromatography data to generate one of an Individual chart, a Moving Range chart, or a Range chart, and generating performance data by applying a statistical process control to the Individual chart, Moving Range chart, or Range chart by performing a multivariate data analysis or performing a principal component analysis. In some embodiments, performing the action based on the processed chromatography data may include performing the action based on the performance data. In some embodiments, the action may include generating a notification of an event, generating an evaluation of the event, or generating a deviation notification form.

Some aspects of the present disclosure may include a process control method, the method including receiving processed chromatography data comprising a combination of a first block and a first signal, performing a transition analysis on the processed chromatography data, generating one of an Individual-Moving Range-Range (I-MR-R) chart based on the transition analysis, generating performance data by applying a multivariate statistical analysis method to the I-MR-R chart, and performing an action based on the performance data. The action may include one of generating a notification of an event, generating an evaluation of the event, or generating a deviation notification form.

In some embodiments, the processed chromatography data may comprise a selection of raw chromatography data to which a noise reduction technique has been applied. In some embodiments, the selection of raw chromatography data may be received from a chromatography process skid.

BRIEF DESCRIPTION OF THE DRAWINGS

The accompanying drawings, which are incorporated in and constitute a part of this specification, illustrate the disclosed embodiments, and together with the description, serve to explain the principles of the disclosed embodiments. In the drawings:

FIG. 9 depicts an exemplary data smoothing process, according to some aspects of the present disclosure.

FIG. 23 depicts an exemplary user interface, according to some aspects of the present disclosure.

FIG. 24 depicts an exemplary report, according to some aspects of the present disclosure.

DETAILED DESCRIPTION

Figure 1:
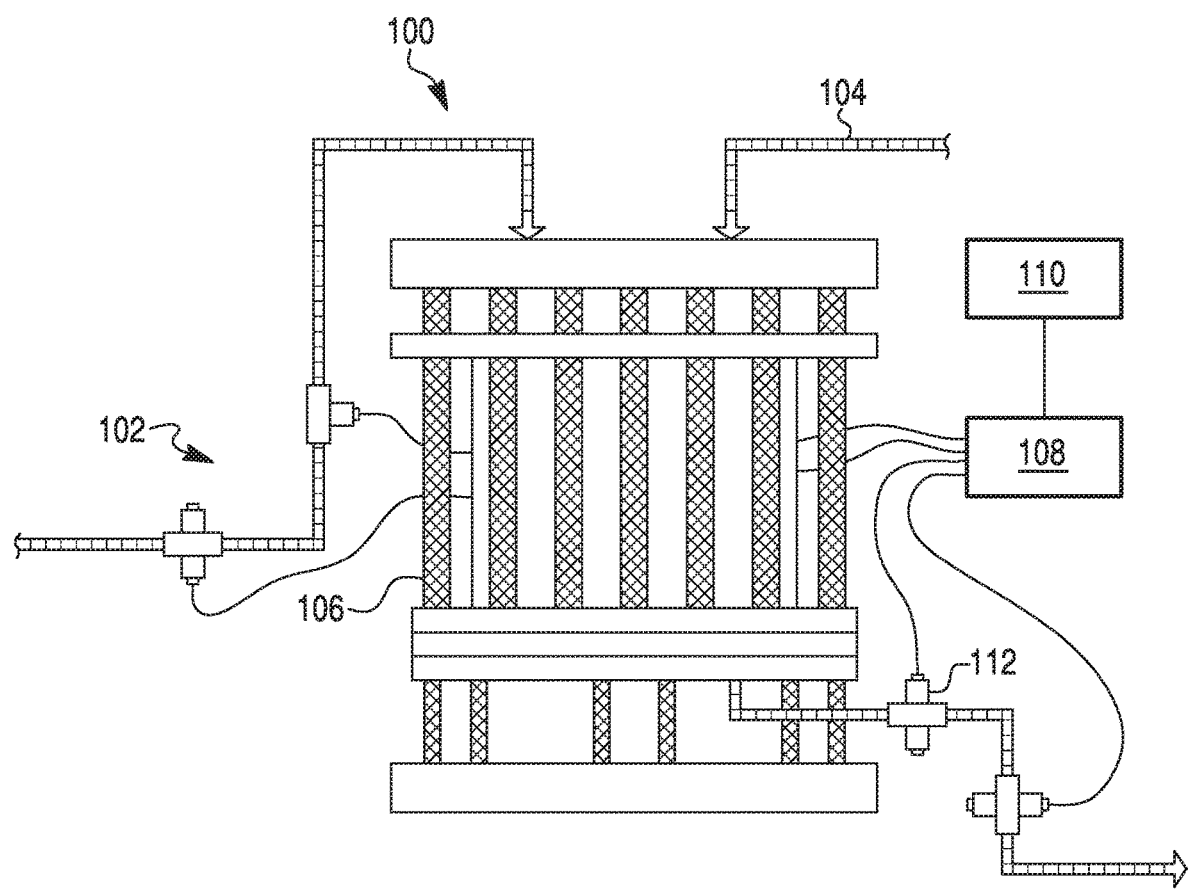
FIG. 1 depicts, in schematic form, an exemplary chromatography system with which various embodiments of the present disclosure may be implemented.

The present disclosure relates to improvements in drug product manufacturing and laboratory processes, as well as improvements in computer functionality related to drug product manufacturing and laboratory processes. In particular, aspects of the present disclosure relate to chromatography methods and systems, and to methods and systems for chromatography data analysis, e.g., for monitoring and control of chromatography processes and systems.

Unless otherwise defined, all technical and scientific terms used herein have the same meaning as is commonly understood by one of ordinary skill in the art to which this invention belongs. The materials, methods, and examples are illustrative only and not intended to be limiting. One of ordinary skill in the art will appreciate that routine variations on the disclosed materials, methods, and examples are possible without undue experimentation. All publications, patent applications, patents, sequences, database entries, and other references mentioned herein are incorporated by reference in their entirety. In case of conflict, the present specification, including definitions, will control.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." For such terms, and for the terms "for example" and "such as," and grammatical equivalences thereof, the phrase "and without limitation" is understood to follow unless explicitly stated otherwise. As used herein, the term "about" and the signifier "~" are meant to account for variations due to experimental error. All measurements reported herein are understood to be modified by the term "about," whether or not the term is explicitly used, unless explicitly stated otherwise. As used herein, the singular forms "a," "an," and "the" include plural referents unless the context clearly dictates otherwise. Moreover, in the claims, values, limits, and/or other ranges mean the value, limit, and/or range +/−10%.

As used herein, the term "antibody" includes antigen-binding molecules as well as antigen-binding fragments of full antibody molecules. The terms "antigen-binding portion" of an antibody, "antigen-binding fragment" of an antibody, and the like, as used herein, include any naturally occurring, enzymatically obtainable, synthetic, or genetically-engineered polypeptide or glycoprotein that specifically binds an antigen to form a complex. Antigen-binding fragments of an antibody may be derived, e.g., from full antibody molecules using any suitable standard techniques such as proteolytic digestion or recombinant genetic engineering techniques involving the manipulation and expression of DNA encoding antibody variable and optionally constant domains. Such DNA is known and/or is readily available from, e.g., commercial sources, DNA libraries (including, e.g., phage-antibody libraries), or can be synthesized. The DNA may be sequenced and manipulated chemically or by using molecular biology techniques, for example, to arrange one or more variable and/or constant domains into a suitable configuration, or to introduce codons, create cysteine residues, modify, add or delete amino acids, etc.

Non-limiting examples of antigen-binding fragments include: (i) Fab fragments; (ii) F(ab')2 fragments; (iii) Fd fragments; (iv) Fv fragments; (v) single-chain Fv (scFv) molecules; (vi) dAb fragments; and (vii) minimal recognition units consisting of the amino acid residues that mimic the hypervariable region of an antibody (e.g., an isolated complementarity determining region (CDR) such as a CDR3 peptide), or a constrained FR3-CDR3-FR4 peptide. Other engineered molecules, such as domain specific antibodies, single domain antibodies, domain-deleted antibodies, chimeric antibodies, CDR-grafted antibodies, diabodies, triabodies, tetrabodies, minibodies, nanobodies (e.g. monovalent nanobodies, bivalent nanobodies, etc.), small modular immunopharmaceuticals (SMIPs), and shark variable IgNAR domains, also are encompassed within the expression "antigen-binding fragment," as used herein.

As used herein, the term "biologic" may refer to a large molecule (e.g., having a size greater than 30 kDa) created in a living system such as a cell. Biologics may include proteins (e.g., antibodies), nucleic acids, large sugars, etc. Unlike small molecules that may have well-defined chemical structures, biologics may have highly complex structures that cannot be easily quantified by laboratory methods. Thus, it may be desirable to achieve purity, consistency, and quality in the manufacturing of biologics to ensure biologic quality, especially when intended for medical use.

As used herein, the term "chromatography" may refer to any preparatory or analytical chromatography method. While much of the present disclosure is provided in the context of preparatory packed-bed chromatography for purification of a biologic, it is contemplated that the systems and methods disclosed herein may apply to a wide variety of chromatography processes.

As used herein, the term "drug product" may refer to a volume of a formulated drug substance apportioned into a primary packaging component for packaging, transportation, delivery, and/or administration to a patient. Drug products may include active ingredients, including, e.g., biologics.

As used herein, the term "raw material(s)" may refer to a mixture including one or more biologics, suitable for separation or purification via a chromatography process.

As used herein, the term "raw chromatography data" may refer to chromatography data in its native data state as initially collected. For example, raw chromatography data may be in a .RES file type, other type of raw file type, or in a database containing values obtained directly from measurement equipment.

As used herein, the term "extracted chromatography data" can refer to chromatography data that has been moved from the raw data without any translation. This can be in an Excel or .CSV file format, or in a database located within a chromatography system or computer system.

As used herein, the term "noise reduced data" can refer to chromatography data, such as transition data, that has been normalized, smoothed, derived, and/or peak selected.

As discussed above, there exists a need to monitor and maintain chromatography column and process quality, e.g., over multiple chromatography runs, over multiple lots, and as time passes both during and between runs. Systems and methods disclosed herein may allow for analysis of chromatography transition data (also known as "transition analysis"), and use of such analyses in monitoring chromatographic performance, identifying changes in chromatographic performance, and performing actions with respect to a chromatography system based on such analyses and processes. Moreover, systems and methods disclosed herein may, in some aspects, be a part of one or more in-process manufacturing or purification controls, and/or may allow for in-process controls using data collected in standard chromatography processes, thus minimizing increases in cost and work required to implement separate process controls.

Reference will now be made in detail to the exemplary embodiments of the present disclosure described below and illustrated in the accompanying drawings. Wherever possible, the same reference numbers will be used throughout the drawings to refer to same or like parts.

FIG. 1 depicts, in schematic form, an exemplary chromatography system 100 with which various embodiments of the present disclosure may be implemented. System 100 includes a mobile phase liquid supply system 102, a material injection system 104, a column 106, a process controller 108, a computing device 110, and a detector 112.

System 100 may be all or part of a chromatography system, including a chromatography column 106. In some instances, system 100 may be a chromatography skid. System 100 may include any hardware and/or software required to run a chromatography column. System 100 may be configured to perform any one of various types of chromatography, such as high performance liquid chromatography (HPLC), ion exchange chromatography, size exclusion chromatography, hydrophobic interaction chromatography (HIC), reverse phase chromatography, mixed-mode chromatography, or affinity chromatography. System 100 may be used, for example, to separate biologics in a raw mixture, isolate and/or purify a single type of biologic, and/or eliminate contaminants from a mixture. In some instances, system 100 may be a part of a drug product manufacturing system, such as a system for manufacturing a drug product containing a biologic, such as an antibody.

Mobile phase liquid supply system 102 may be any suitable system for supplying a mobile phase to an inlet of column 106. Mobile phase liquid supply system 102 may include one or more reservoirs to hold mobile phase liquid(s) used to drive raw materials injected by material injection system 104 through column 106. Mobile phase liquid system 102 may include one or more pumps configured to impart pressure to the mobile phase liquid(s). In some embodiments, pumps of mobile phase liquid supply system 102 may be configured to mix two or more solvents (e.g., from two or more reservoirs) in a desired ratio prior to supplying the combined solution to the inlet of column 106. In some embodiments, mobile phase liquid supply system 102 may be configured to supply a first mobile phase to an inlet of column 106, and then supply a second mobile phase to an inlet of column 106 after a desired volume of the first mobile phase has been supplied. In some embodiments, mobile phase liquid supply system may be controlled by a process controller 108, or by human interaction.

Material injection system 104 may be any suitable system for supplying raw material requiring separation and/or purification in column 106. In some embodiments, for example, material injection system 104 may include one or more reservoirs to hold raw materials. Such raw materials may include one or more biologics, contaminants, solvents, or other materials.

Column 106 may be any column suitable for separating and purifying injected raw materials from material injection system 104. One of ordinary skill in the art will recognize that column 106 may have any of a wide variety of sizes (e.g., diameters ranging from about 30 cm to about 1500 cm) and may be packed with any of a wide variety of stationary phases. The size, shape, and pack of column 106 may be chosen in view of the raw material requiring separation in column 106.

Process controller 108 and/or computing device 110 may be suitable for controlling aspects of system 100 during a chromatography run. Process controller 108 may be linked to one or more parts of system 100, including mobile phase liquid supply system 102, material injection system 104, column 106, computing device 110, and detector 112. In some embodiments, process controller 108 may be a computer programmed to control parts of system 100 according to a desired procedure. For example, in some embodiments, process controller may be programmed to switch pumps of mobile phase liquid supply system 102 on and off, and to turn detector 112 on and off. In some embodiments, process controller 108 may have a display and/or other user interface elements (e.g., buttons, a mouse, a keyboard, a touch screen, etc.), through which commands may be input by, e.g., a human operator. In other embodiments, process controller 108 may be programmed using, e.g., computing device 110.

Computing device 110 may be any computer, such as a desktop computer, a server computer, a laptop, a tablet, or a personal portable device (e.g., a smart phone). In some embodiments, computing device 110 may have a display and/or other user interface elements (e.g., buttons, a mouse, a keyboard, a touch screen, etc.) through which commands may be input by, e.g., an operator. Computing device 110 may also collect data from process controller 108 and/or other parts of system 100, such as detector 112. Computing device 110 may include one or more programs configured to display or output such data, e.g., to a screen, a hard disk, or via an internet connection to a remote location. Computing device 110 itself may be connected to other aspects of system 100 via a wired connection, or may be wirelessly connected to other aspects of system 100 (e.g., process controller 108). In some embodiments, computing device 110 may be located remotely in relation to system 100. In some embodiments, computing device 110 may be configured to display one or more user interfaces or reports. In some embodiments, process controller 108 and computing device 110 may be a single device.

Detector 112 may be any type of detector suitable for detecting one or more characteristics at the outlet of column 106. Although a single detector 112 is depicted in FIG. 1, system 100 may include more than one such detectors configured to detect a variety of characteristics at the outlet of column 106. Such characteristics may include, for example, column exit conductivity, pH, optical density, and other characteristics. In some embodiments, detector 112 may be, for example, an electrical conductivity detector, an ultraviolet (UV) detector, a fluorescence detector, a refractive detector, a pH detector, a pressure gauge, or any other type of detector.

Figure 2:
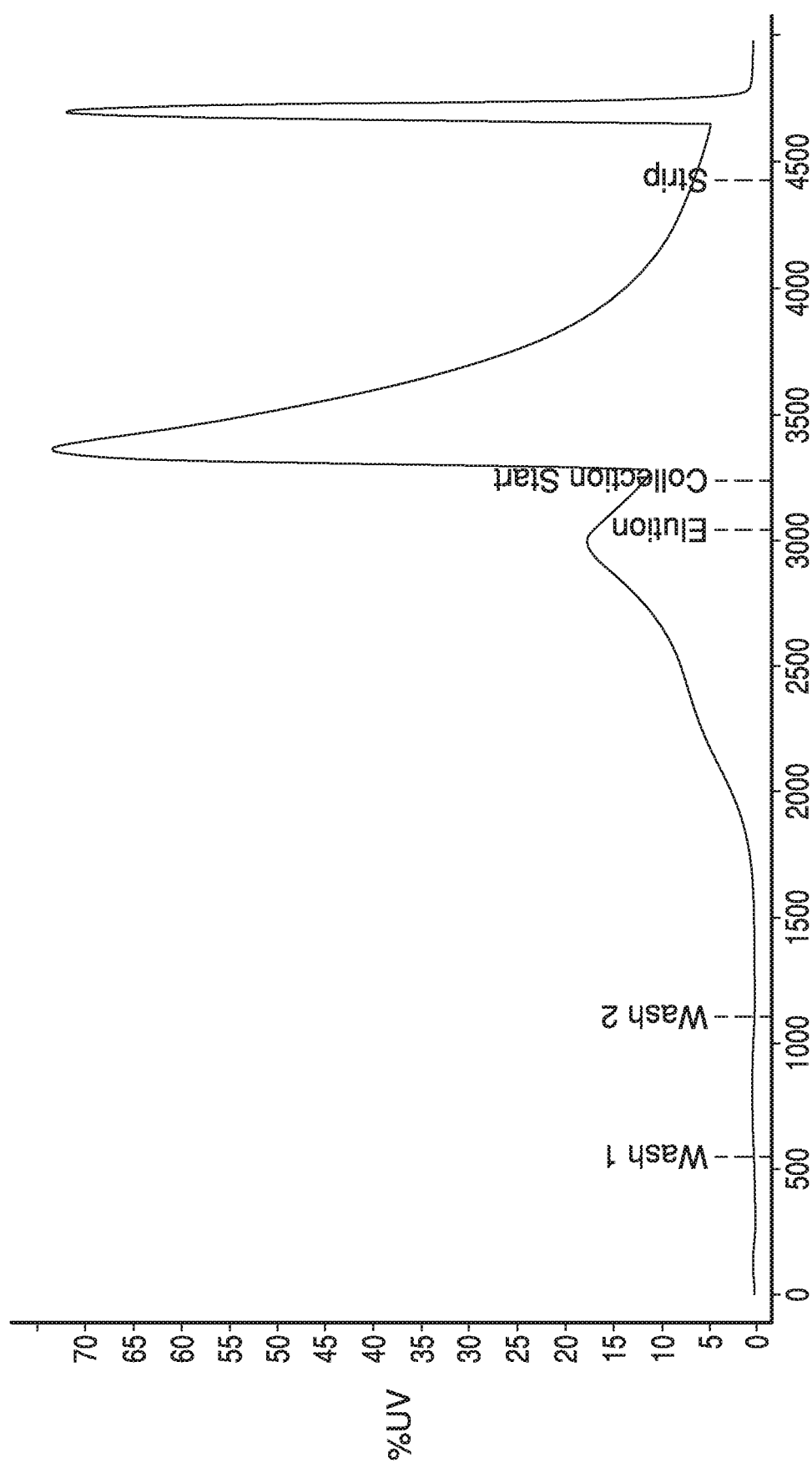
FIG. 2 depicts an exemplary chromatogram.

A chromatography cycle, e.g., run using system 100, may typically include a sequence of steps. Such steps may include, for example, a cleaning-in-place step, an equilibrium step, a loading step, a wash step, an elution step, a strip step, and a regeneration step. A chromatography cycle may be tracked and/or recorded using data collected from a detector at the outlet of a chromatography column (e.g., detector 112 at the outlet of column 106). UV detection, for example, and a UV chromatogram, may be used to track a chromatography process through, e.g., wash, elution, collection, and strip steps. FIG. 2 depicts an exemplary UV chromatogram having a typical profile for collection of a single protein. As volume of liquid passes through the column (depicted by the x-axis), the UV detector detects a fairly steady rise in absorbance with a single peak near the start of the elution step. Collection may be begun after the small elution peak, during which absorbance spikes as the majority of the analyte passes the UV detector.

Figure 3:
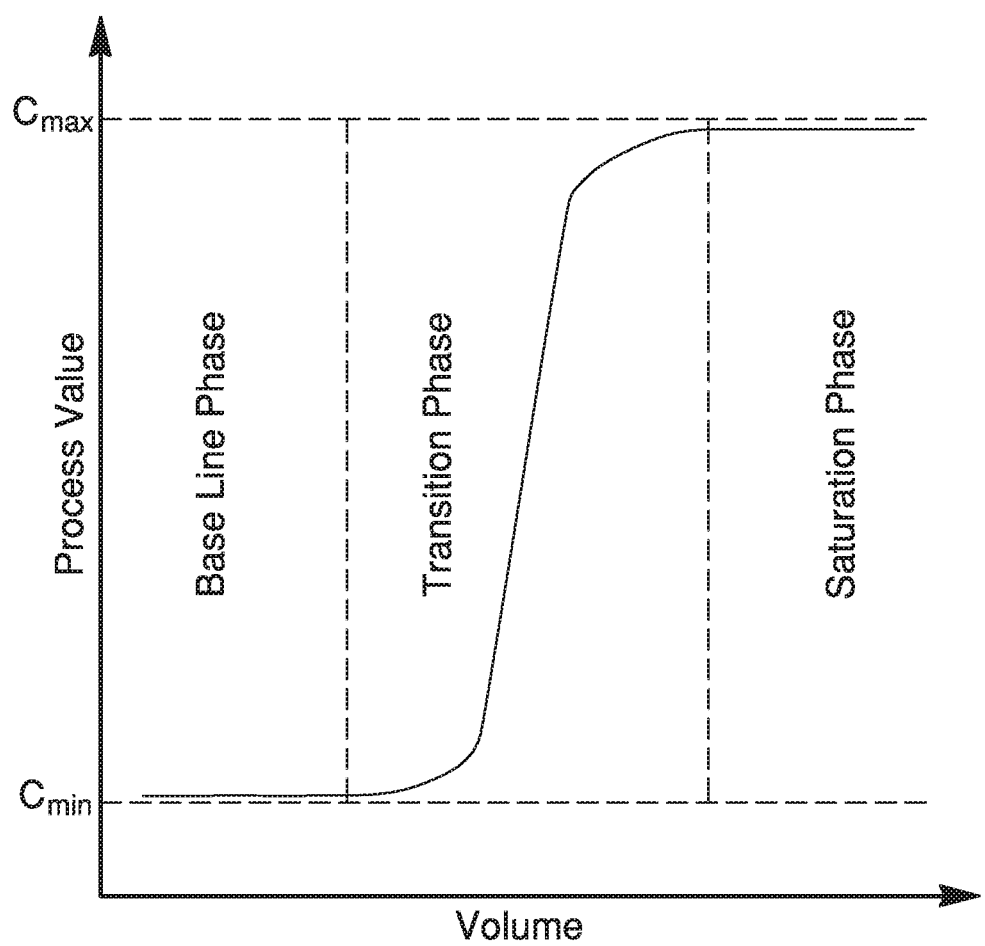
FIG. 3 depicts an exemplary normalized plot of a chromatography step-up transition.

A chromatography (or chromatographic) transition is the response at the outlet of a column (e.g., column 106) to a change in step at the column's inlet (e.g., a change from a wash step to an elution step, or a change from an elution step to a strip step) as one mobile phase is replaced with another. Depending on what parameters are being detected at the outlet of a column (by, e.g., one or more of detector 112), a transition may be detected as an increase (a step-up transition) or decrease (step-down transition) in one or more parameters, followed by a plateau of that parameter after transition has occurred. For example, FIG. 3 depicts an exemplary normalized plot of a chromatography step-up transition, divided into three phases. Prior to the transition, a detector detects a baseline value of a parameter. During transition, the parameter "steps up" or increases, and then plateaus after transition. In some cases, the plateau after a step-up transition is due to detector saturation. The data derived during transition are quantitative and sensitive to subtle changes in performance of the column.

Examples of measurable parameters that may change over a transition include conductivity, pH, salt concentration, light absorption, fluorescence after excitation with light of a suitable wavelength, refractive index, electrochemical response, and data generated by mass spectrometric analysis. One of ordinary skill in the art will understand, however, that any other measurable parameters that may change over a transition may be of use in transition analyses according to the present disclosure.

To perform a transition analysis to determine quality and/or integrity of a chromatography column and/or process, chromatography data may be divided into a plurality of blocks, each block corresponding to a step in the chromatography process (e.g., a cleaning-in-place block, an equilibrium block, a loading block, a wash block, an elution block, a strip block, a regeneration block, a storage block, etc.). Each block includes a plurality of signals provided by one or more detectors during the block. To perform a transition analysis, any number or combination of blocks and signals can be used, such as between 1 and 8 blocks (e.g., 1 block, 2 blocks, 3 blocks, 4 blocks, or 5 blocks), and between about 1 and 8 signals (e.g., 1 signal, 2 signals, 3 signals, 4 signals, 5 signals, 6 signals, or 7 signals.). More blocks and/or signals may also be used.

Figure 4:
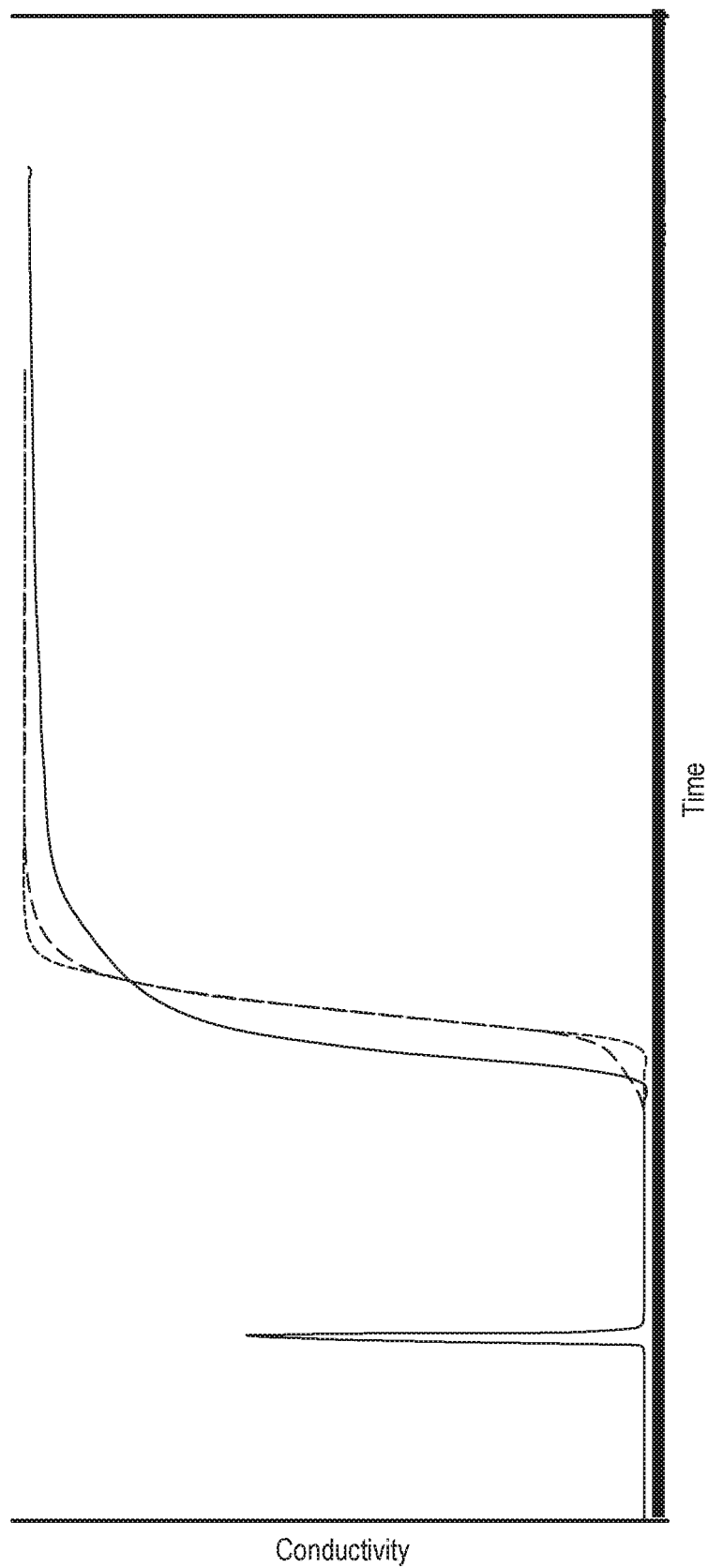
FIG. 4 depicts a plot of the chromatography step-up transitions of equilibration conductivity blocks for three lots, according to some aspects of the present disclosure.

FIG. 4 depicts, an exemplary plot of detected conductivity as a function of volume, during step-up transitions in the equilibration blocks for three chromatography runs. Each run included the same chromatography process on the same raw material in the same column, including isolation of the same protein, but different lots of raw materials were used. The first spike (in all three runs) represents a prime of the system. After the spike occurs, as can be seen, the three runs exhibit variation in the transition phase. The shortest dashed line depicts the closest to an ideal transition phase, as the transition is the most "vertical" (i.e., occurs over the shortest amount of volume). The longer dashed line shows some characteristics indicative of column failure, namely an early start to the transition phase, and a tapered ending. Overall, this transition occurs over a larger amount of volume. The solid line shows stronger characteristics of column failure, as the transition phase begins very early and takes excessive time to reach saturation. While these differences are visually apparent, they may not be easily quantifiable or given context without being comparable to one another. The present disclosure provides systems and methods for performing analyses using these data, and for reliably performing process controls using such analyses.

Figure 5:
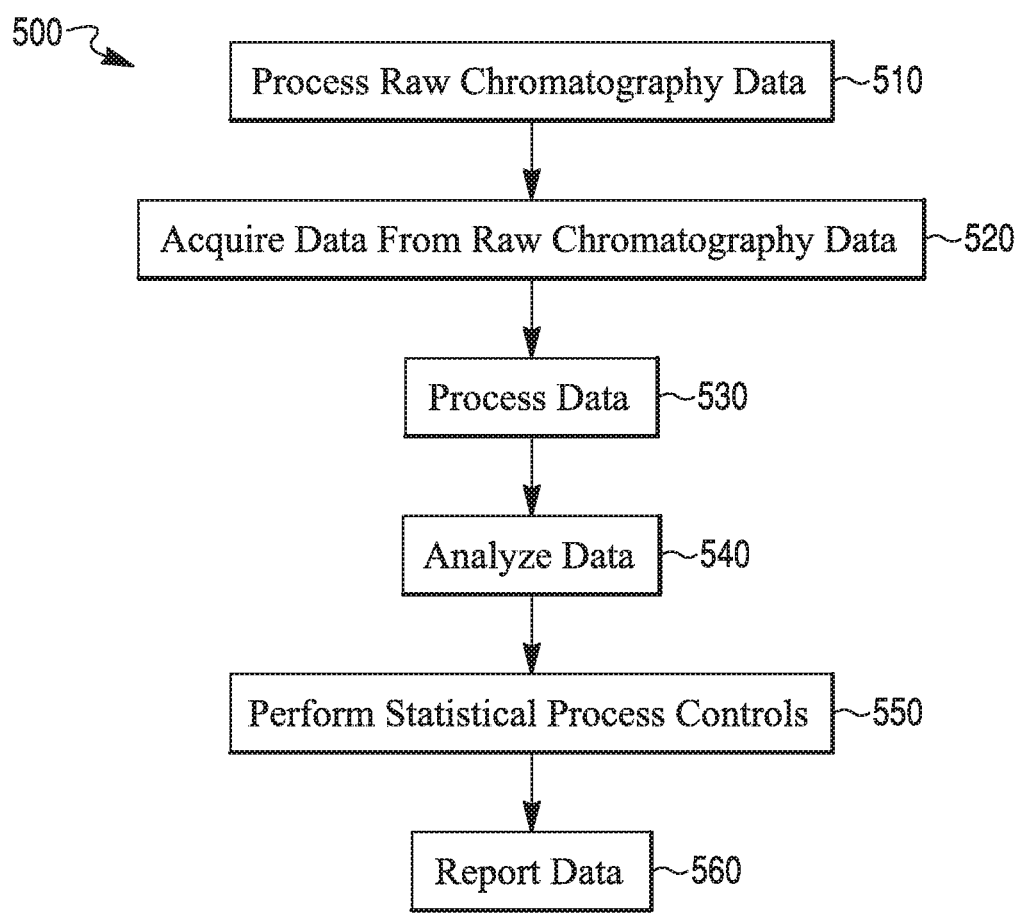
FIG. 5 depicts an exemplary process of analyzing chromatography data and performing process controls, according to some aspects of the present disclosure.
Figure 6:
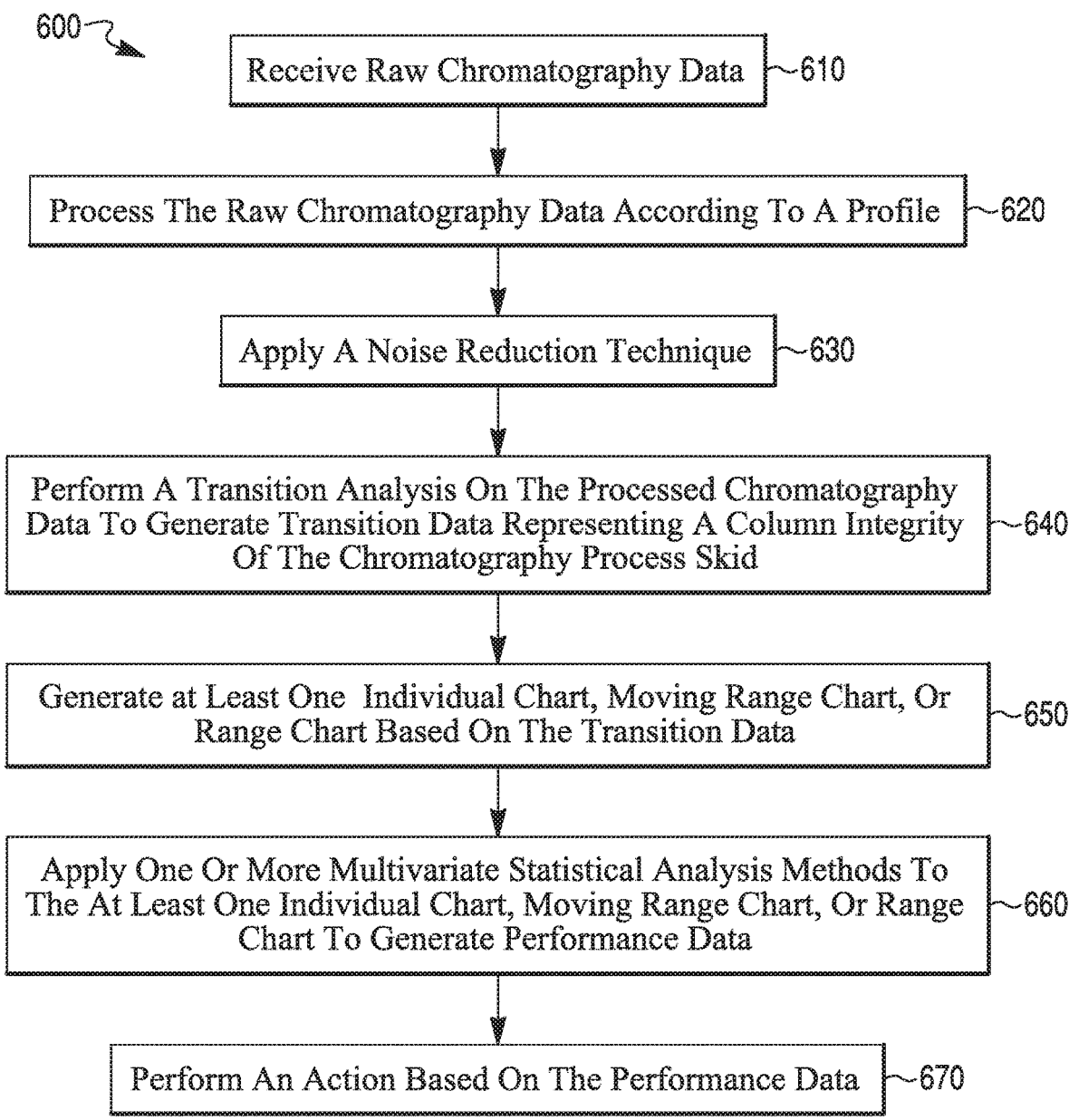
FIG. 6 depicts a further exemplary process of analyzing chromatography data and performing process controls, according to some aspects of the present disclosure.

FIGS. 5 and 6 depict exemplary processes of analyzing chromatography data and using such analyses to perform process controls according to some aspects of the present disclosure. FIG. 5 depicts an exemplary process at a more general level of detail, whereas FIG. 6 depicts more details of an exemplary process. While they are described separately below, details and specifics of the process of FIG. 6 may be applicable to the process of FIG. 5, and vice versa.

FIG. 5 depicts an exemplary general process 500 of analyzing chromatography data and performing process controls according to some aspects of the present disclosure. According to step 510, raw chromatography data may be processed. According to step 520, data may be acquired from the raw chromatography data. According to step 530, the acquired data may be processed. According to step 540, the processed data may be analyzed (e.g., a transition analysis). According to step 550, one or more statistical process controls may be performed. According to step 560, data may be reported.

According to step 510, raw chromatography data may be processed. Raw chromatography data may be obtained by running one or more chromatography cycles and obtaining signals from one or more detectors (e.g., detector 112 of column 106). The signals may comprise, for example, a UV signal, a conductivity signal, a pressure signal, a pH signal, and/or other signals. The data may be obtained at, e.g., process controller 108 and/or computing device 110, and may be stored in, e.g., a database or a .RES file. The data may include, for example, a series of signal values, and corresponding volumes at which the signal values were measured. The data may also include indicators of the beginnings and ends of each block/step in the chromatography cycle.

Processing the data may include extracting the data and organizing the data in a data file in a computing device, e.g., computing device 110. Exemplary data files include, e.g., a spreadsheet, a text file, a database, combinations thereof, and the like. Data files containing extracted chromatography data may be assigned various metadata, to allow for consistent storage and processing. Metadata may include, for example, names, names, dates, column run times, column run volumes, column mobile phases, identification of raw mixtures, identification of manufacturing processes for which the column is used, and/or any other data that may allow for the consistent automated or manual processing of the data files.

According to step 520, data may be acquired for analysis from the data files. In some embodiments, an automated software program (such as Cron, Jobber, a macro, or other automated or scheduling software) may monitor one or more possible data file storage locations for one or more data files that fit one or more profiles. Data files may be assigned a profile based on, e.g., the metadata associated with the data files. A profile may be, for example, a pre-made series of selection criteria for selecting one or more block-and-signal combinations suitable for performing a transition analysis. A profile may be assigned based on, for example, the type of column being run, characteristics of the mobile phase, a volume of mobile phase being run, a column run time, or any other characteristics of the data files.

Acquiring data for analysis may include selecting one or more block-and-signal combinations based on an assigned profile, where a block corresponds to a step in a chromatography process, and a signal corresponds to a type of data being collected (e.g., UV data, conductivity, pH, etc.). In some embodiments, a primary block-and-signal combination may be selected. In further embodiments, a primary block-and-signal combination and one or more secondary block-and-signal combinations may be selected. Transition analysis may be performed first with the primary block-and-signal combination, and optionally second with the one or more secondary block-and-signal combinations. Profiles, selection criteria, and block-and-signal combinations are described in further detail with respect to process 600.

According to step 530, the acquired data may once again be processed to obtain noise reduced data. Processing the acquired data may include applying one or more smoothing and/or noise reduction techniques to a data set in the acquired data, such as the data associated with the primary block-and-signal combination, and optionally the data associated with the secondary block-and-signal combination. In some embodiments, processing the data may include standardizing a size of the data set, to allow for consistent impact of smoothing windows. In some embodiments, processing the data may include normalizing the data, in order to eliminate variation based on the magnitude of transitions. This variation may be due to unique preparations of mobile phase buffers that contain inherent variability in final value for the baseline phase or the saturation phase.

Noise reduction techniques may include removal of implicit errors introduced by measurement tools (e.g., detector 112 in system 100), and random errors introduced by batch processes when data are gathered (e.g., in earlier steps of method 500). Noise reduction may include de-duplication of records in a data set, outlier detection and removal, and/or any other technique to increase a signal-to-noise ratio within a data set. Noise reduction may also include data smoothing and signal rejection, which is described in further detail below with respect to process 600.

The processed data may include, for example, a step yield and/or measurements of other mobile phase parameters, which can be in the form of one or more smoothed curves corresponding to one or more chromatography step transitions. The one or more curves may represent a normalized solute signal data array.

According to step 540, the noise reduced data may be analyzed. Such analysis may be a transition analysis. The transition analysis may include performing one or more mathematical processes on the processed data. For example, one or more curves may be generated from the processed data by, for example, taking a first derivative of the curve, to generate another curve characterized by a peak. This curve can be analyzed to generate performance parameters such as, for example, a number of inflection points, a maximum rate of change, a breakthrough volume, a cumulative error, NG-HETP, curve asymmetry, and Gaussian HETP. These performance parameters, either alone or in combination with past data, may aid in determinations of column integrity.

For example, an increase in a number of inflection points may indicate that a slight amount of early breakthrough of a transition solution is occurring, which may be associated with an integrity breach. A decrease in maximum rate of change over multiple column uses may indicate that a transition is taking place over a larger volume, which can be an indication of an integrity breach. A decrease in breakthrough volume may characterize an integrity breach as well. An increase in either NG-HETP or Gaussian HETP may indicate a decrease in column integrity. Other characteristics of a transition may be generated based on a modification of the data set variance, skewness, kurtosis, peak asymmetry, breakthrough or wash-out volume, and total error. Transition analysis is described in further detail below. Systems and methods of performing transition analyses are also described in, e.g., Larson et al., *Use of Process Data To Assess Chromatographic Performance in Production-Scale Protein Purification Columns*, Biotechnol. Prog., 2003, 19, 485-492, which is incorporated by reference herein in its entirety.

Results of a transition analysis may be stored, e.g., in a memory element of computing device 110, or in another computing device, along with other data. For example, all raw data, initial data sets, smoothed data sets, and transition analysis data may be stored.

According to step 550, one or more statistical process controls may be performed using the results of the transition analysis. In some embodiments, a statistical process control can include performing techniques in one of several categories, including 1) a non-conventional control chart analysis (e.g., an Individual chart, Moving Range chart, and/or Range chart analysis), 2) a multivariate analysis (MVA), or 3) a combination of a non-conventional control chart analysis and MVA. These processes may include, for example, analyzing the results of the transition analysis as a part of a larger set of data, including transition analysis results from prior chromatography runs, e.g., runs in the same production cycle, runs of the same product lot, or runs of the same raw mixture. These processes are described with further specificity below, with respect to process 600.

A result of performing one or more statistical process controls may be referred to as performance evaluation data. Performance evaluation data can refer to any process data, in, including transition analysis results, that have meaning when evaluating the reproducibility and success of the process.

According to step 560, data may be reported. In some embodiments, one or more reports may be generated. For example, the methods and systems disclosed can generate a tabular report of any results analyzed using a given profile. Reports can be generated based on a desired number of prior chromatography runs, for a specific timeframe, for specific runs, and/or for specific lots. An example report is depicted in FIG. 24, and is described in further detail below.

FIG. 6 depicts, in further detail than FIG. 5, an exemplary process 600 of analyzing chromatography data and performing process controls according to some aspects of the present disclosure. According to step 610, raw chromatography data may be received. According to step 620, the raw chromatography data may be processed according to a profile. According to step 630, a noise reduction technique may be applied. According to step 640, a transition analysis may be performed on the processed chromatography data to generate transition data representing a column integrity. According to step 650, at least one of an Individual (I) chart, Moving Range (MR) chart, or Range (R) chart may be generated based on the transition data. According to step 660, one or more multivariate statistical analysis methods may be applied to the at least one I chart, MR chart, or R chart to generate performance data. According to step 660, an action may be performed based on the performance data.

According to step 610, raw chromatography data may be received. As with process 500, the raw chromatography may be obtained from, e.g., a chromatography system such as system 100. The raw chromatography data may comprise a plurality of signals associated with a plurality of blocks. Receiving the raw chromatography data may include directly retrieving raw chromatography data from one or more detectors (e.g., detector 112 of system 100), or from a computing device (e.g., computing device 110), and/or may include monitoring a network location for a raw chromatography data file. The raw chromatography data may, in some embodiments, be processed, as described above with respect to step 510 in process 500.

Figure 7:
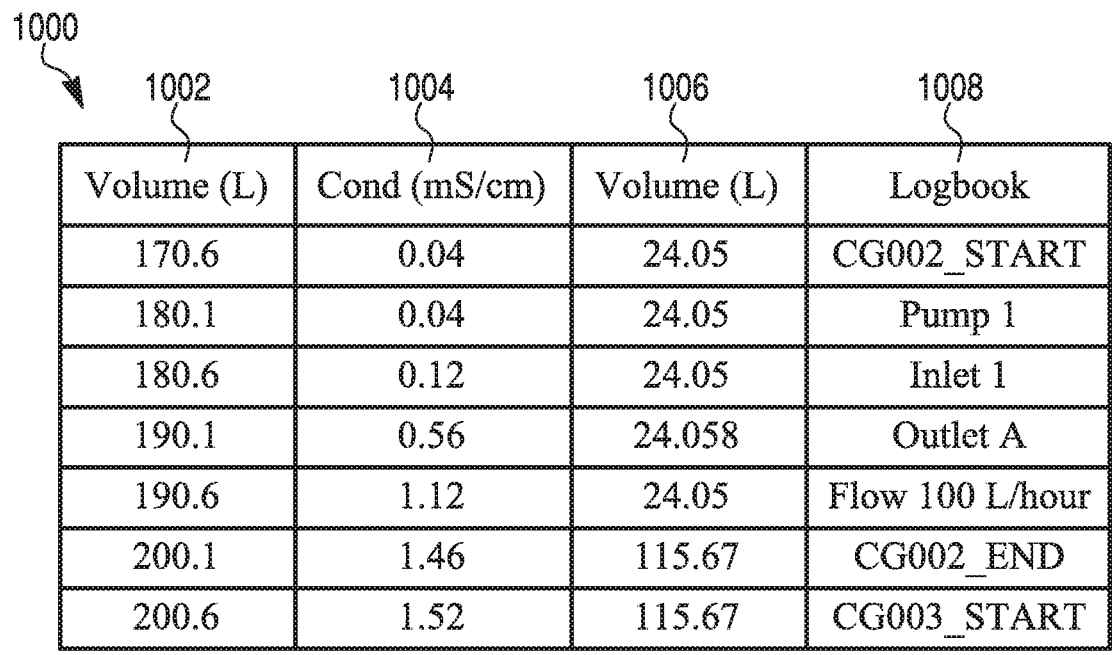
FIG. 7 depicts an exemplary data file, according to some aspects of the present disclosure.

An exemplary data file 1000 of extracted chromatography data is depicted in FIG. 7. Data file 1000 may include, for example, a data file name, which may aid in identification of the data file by an automated system. As shown, extracted chromatography data in data file 1000 may be in spreadsheet form (e.g., Microsoft Excel). Data file 1000 may include a volumetric measurement in a first column 1002, which may correspond to periodic measurements of a total volume that has passed through the chromatography system. A second column 1004 may include signal measurements (e.g., UV, Conductivity, pH, etc.) corresponding to each of the volumetric measurements in column 1002. In this case, second column 1004 contains conductivity data as expressed in mS/cm. Other columns may provide additional data. Here, for example, a third column 1006 includes volumetric measurements corresponding to logbook entries in a fourth column 1008. This may allow for identification of various characteristics of the chromatography run, such as block/step start and end points (CG002_START, CG002_END, CG003_START), flow rate, and points at which aspects of the chromatography system were initiated (e.g., Pump 1 may correspond to a time when a pump, e.g., associated with mobile phase liquid supply system 102, is activated). One of ordinary skill will appreciate that many variations on data file 1000 are possible. For example, although volumetric measurements are shown in data file 1000 as markers of progress in a chromatography run, other measurements may be used, such as time. Additional columns for other signal data may be included, and additional logbook data may be included (e.g., identifying the mobile phase, identifying the analyte, etc.)

Referring back to FIG. 6, according to step 620, the chromatography data may be processed according to a profile. As described briefly with respect to step 520, a profile may be selected for a chromatography data file according to characteristics of the chromatography data in the file. For example, profiles may have previously been created for a given type of chromatography run, a given chromatography column, and/or a given analyte. Such profiles may thus be matched with a chromatography data file for the appropriate run, column, and/or analyte.

In some aspects, a profile can be created by a user. The profile may be associated with a specific drug or drug product. In one aspect, the drug is a small molecule. In other aspects, the drug is a peptide or a polypeptide.

In some aspects, the drug is a vascular endothelial growth factor (VEGF) derivative. In other aspects, the drug is aflibercept, which is described in one or more of U.S. Pat. Nos. 7,070,959, 7,303,746, 7,303,747, 7,306,799, 7,374,757, 7,374,758, 7,531,173, 7,608,261, 7,972,598, 8,029,791, 8,092,803, 8,343,737, and 8,647,842, each of which is incorporated by reference herein in its entirety.

In other aspects, the drug is an antigen-binding molecule. In some aspects, the antigen-binding molecule is an antibody or antigen-binding fragment. In some aspects, the drug is alirocumab, which is described in U.S. Patent Application Publication Nos. 2014/0356371 and 2014/035670, each of which is incorporated by reference in its entirety. In another aspect, the drug is sarilumab, which is described in U.S. Patent Application Publication Nos. 2016/0152717, 2014/0302053, and 2013/0149310, each of which is incorporated by reference in its entirety. In another aspect, the drug is dupilumab, which is described in U.S. Patent Application Publication No. 2014/0356372, which is incorporated by reference herein in its entirety. In another aspect, the drug is selected from the group consisting of evolocumab, bevacizumab, ranibizumab, tocilizumab, certolizumab, etanercept, adalimumab, abatacept, infliximab, rituximab, anakinra, trastuzumab, pegfilgrastim, interferon beta-1a, Insulin glargine [rDNA origin] injection, epoetin alpha, darbepoetin, filigrastim, and golimumab.

In some embodiments, a profile may be configured to direct a sentinel software program (e.g., a macro, Jobber, Cron, or other scheduling software) to periodically scan a designated network location for chromatography data files. A profile may direct data acquisition from a file when the file name matches a file name identifier in the profile.

Once a profile has selected, or has been selected for or matched with a data file, the data file may be scanned. For example, with regard to exemplary data file 1000 in FIG. 7, the fourth column 1008, comprising logbook entries, may be scanned for an indication of block start times, end times, flow rates, and the like. For example, with regard to data file 1000, the volumetric measurements corresponding to "CG002_START" and "CG002_END" bracket the volumetric measurements that correspond to the chromatographic operation and signal transition of interest. the first column 1002 and second column 1004 may then be used to extract the full data set of signals and volume measurements for the operation.

Values in a profile may also define one or more selection criteria for selecting one or more combinations of blocks and/or signals in a chromatography data file on which to perform a transition analysis. Thus, profiles may be tools for acquiring preferable subsets of data from a chromatography data file. Selection criteria in a profile may be pre-determined from, e.g., empirical experience, structured optimization, and/or process documentation. Such selection criteria may enable identification of block-and-signal combinations that may allow for more precise, accurate, or otherwise more useful analyses. Such selection criteria may include, for example, whether transition materials are readily available. This includes blocks that transition to, or transition out of product solutions. This allows for additional column assessments in between manufacturing operations if so desired. Such selection criteria may also or alternatively include whether blocks occur at regular cycle intervals. This includes blocks that are not performed after the conclusion of a final collection cycle of a manufacturing lot. Such selection criteria may also or alternatively include whether signals reach detector saturation before or after transition. Such selection criteria may also or alternatively include whether signals approach a stationary phase at a distinct and identifiable level, and do not continually drift. Such selection criteria may also or alternatively include whether signals in a given block have a large difference between minimum and maximum values. Such selection criteria may also or alternatively include whether signals have many inflection points during a transition. Fewer inflection points may indicate more reliable data collection.

Figure 8:
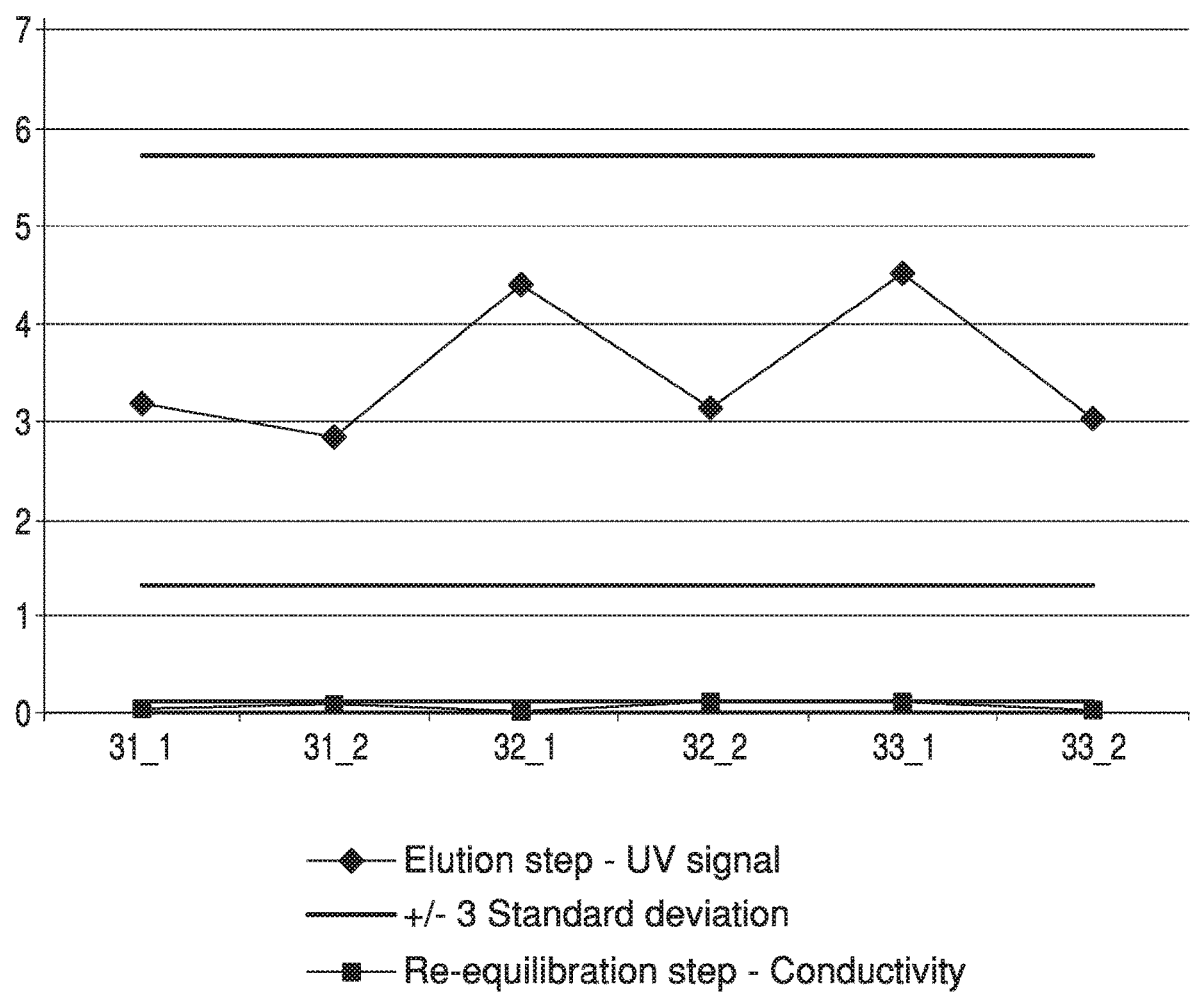
FIG. 8 depicts an exemplary loading plot of a multivariate model, according to some aspects of the present disclosure.

In some instances, prior chromatography runs may assist in identifying suitable selection criteria for selecting block-and-signal combinations in future chromatography runs. FIG. 8, for example, illustrates a plot of NG-HETP calculations for two different block-and-signal combinations (an elution step-UV signal combination, and a re-equilibration step-conductivity signal combination) over six different chromatography lots (Lots A-F). Solid bars denoting three standard deviations for each set are provided as reference. As can be seen from this plot, the NG-HETP calculations for the elution step-UV signal combination exhibit much greater variation than those for the re-equilibration step-conductivity signal combination. It can be seen that both the scale of the trends and the standard deviations are different. When monitoring shifts in performance, it may be desirable to have less variance across lots that are deemed typical. This allows for increased sensitivity when monitoring shifts in performance. Thus, selection criteria for chromatography runs of lots similar to Lots A-F may include a preference for a re-equilibration step and conductivity signal combination over an elution step and UV signal combination. One of skill in the art will appreciate that analysis of prior chromatography runs in similar fashion may reveal other potential block-and-signal combination selection criteria.

In some embodiments, a profile may include instructions to apply one or more selection criteria to a data file having relevant chromatography data. Thus, processing the chromatography data according to a profile may include identifying and extracting a preferred (e.g., primary) block-and-signal combination for transition analysis, and/or one or more additional (e.g., secondary) block-and-signal combinations for transition analysis. In some embodiments, a primary block-and-signal combination will meet the most selection criteria in a profile out of all possible block-and-signal combinations in a chromatography data file. In some embodiments, a secondary block-and-signal combination will meet the second most selection criteria in a profile out of all possible block-and-signal combinations in a chromatography data file. While a primary block-and-signal combination may include data most likely to provide a valuable transition analysis for assessing column and process integrity, a secondary block-and-signal combination can provide a secondary measurement and a cross-check of column integrity.

In some embodiments, a profile according to step 620 may be a data file in and of itself, which may contain instructions for extracting certain data from, or altering, a chromatography data file with relevant metadata. In some embodiments, such instructions in a profile may be executable by a computer program.

Referring back to FIG. 6, after chromatography data has been processed according to a profile, a noise reduction technique may be applied to the processed data according to step 630. As with step 530 of process 500, this step may include applying one or more smoothing and/or noise reduction techniques to the processed data (e.g., the data associated with selected block-and-signal combinations). In some embodiments, this step include standardizing a size of the data set, to allow for consistent impact of smoothing windows. In some embodiments, this step may include normalizing the data, in order to eliminate variation based on the magnitude of transitions. This variation may be due to unique preparations of mobile phase buffers that contain inherent variability in final value for the baseline phase or the saturation phase.

Noise reduction techniques may include removal of implicit errors introduced by measurement tools (e.g., detector 112 in system 100), and random errors introduced by batch processes when data are gathered (e.g., in earlier steps of method 500). Noise reduction may include de-duplication of records in a data set, outlier detection and removal, and/or any other technique to increase a signal-to-noise ratio within a data set.

Noise reduction may also or alternatively include application of a data-smoothing and signal error-rejection algorithm. FIG. 9 depicts, in flow chart form, an exemplary algorithm 900 in this regard. According to steps 902 and 904 of algorithm 900, the algorithm may start, and the relevant signal data (e.g., data that has been processed according to step 620) is retrieved. According to step 906, the retrieved data may be normalized to remove magnitude bias.

A multi-level smoothing algorithm 950 may then be applied. This may include applying one or more initial smoothing filters (steps 908, 910) according to desired smoothing filter setpoints (909, 911). According to step 912, a derivation may optionally be performed. One or more additional smoothing filters may then be applied (steps 914, 916) according to additional desired smoothing filter setpoints (913, 915). The number of smoothing filters (steps 908, 910, 914, 916) that are applied and the number and characteristics of setpoints 909, 911, 913, 915 may vary depending on, e.g., data condition, expected outcomes, signal type, and other factors. Whether or not a derivation is performed on the data may also depend on these factors.

Process may then continue to a dynamic signal error-rejection algorithm 980. This algorithm may be configured to remove data from the retrieved data that is not due to a chromatographic transition. For example, errors that should be removed in order to allow for meaningful transition analysis include alarms, machine arrest, skid sensor malfunctions, or data gaps. This may be achieved by identifying the features expected of a chromatogram transition, such as a derivative duration, a maximum intensity, a duration from initiation, and expected background noise. For example, an initial point rejection 918 may be made based on an expected transition location 919, an initial deadband rejection 920 may be made based on an expected background noise level 921, a derivative height and width rejection may be made based on expected signal error characteristics, and a final deadband rejection may be made based on expected background noise levels 925. Expected transition features may be generated, for example, based on prior accumulated transition data. Upon completion of algorithm 900, according to step 990, the data may be ready to be used in transition analyses.

While algorithm 900 is one exemplary model of a smoothing and signal error-rejection algorithm, one of ordinary skill in the art will recognize that variations upon this algorithm are possible. For example, only the smoothing algorithm 950 may be performed, or only the signal error-rejection algorithm 980 may be performed. Additionally or alternatively, more or fewer smoothing filters may be applied, and/or more or fewer points may be rejected.

After applying a noise reduction and/or smoothing technique to the data, the data may include, for example, step yields and measurements of other mobile phase parameters in the form of a breakthrough or washout curve corresponding to a step transition.

Referring back to FIG. 6, according to step 640, a transition analysis may be performed on the processed chromatography data to generate transition data representing a column integrity. The transition analysis may include performing one or more mathematical processes on the processed data in order to infer dispersion parameters from a step transition. For example, one or more curves may be generated from the processed data by, for example, taking a first derivative of the curve, to generate another curve characterized by a peak. This curve may be used to generate performance parameters such as, for example, a number of inflection points, a maximum rate of change, a breakthrough volume, a cumulative error, NG-HETP, curve asymmetry, and Gaussian HETP. As described with respect to step 540, these parameters may be used as indicators of column integrity, or a lack thereof (e.g., when checked against transition analysis parameters of prior representative chromatography data).

For example, an increase in a number of inflection points may indicate that a slight amount of early breakthrough of a transition solution is occurring, which may be associated with an integrity breach. A number of inflection points may be determined from a number of peaks when plotting the derivative curve against the totalized volume data.

As another example, a decrease in maximum rate of change over multiple column uses may indicate that a transition is taking place over a larger volume, which can be an indication of an integrity breach. The maximum rate of change is equivalent to the maximum value of the derivative curve.

As another example, a decrease in breakthrough volume may characterize an integrity breach as well. Breakthrough volume may be determined by finding the first volume value at which the signal as either less than 95% of its highest value (for a high to low transition) or greater than 5% of its lowest value (for a low to high transition).

As another example, an increase in either NG-HETP or Gaussian HETP may indicate a decrease in column integrity. Other characteristics of a transition may be generated based on a modification of the data set variance, skewness, kurtosis, peak asymmetry, breakthrough or wash-out volume, and total error. Systems and methods of performing transition analyses are also described in, e.g., Larson et al., *Use of Process Data To Assess Chromatographic Performance in Production-Scale Protein Purification Columns*, Biotechnol. Prog., 2003, 19, 485-492, which is incorporated by reference herein in its entirety.

Results of a transition analysis may be stored, e.g., in a memory element of computing device 110, or in another computing device, along with other data. For example, all raw data, initial data sets, smoothed data sets, and transition analysis data may be stored.

Referring back to FIG. 6, according to step 650, at least one of an Individual (I) chart, Moving Range (MR) chart, or Range (R) chart may be generated based on the transition data. For simplicity, this disclosure will refer to them collectively as an I-MR-R chart; however, "I-MR-R chart" is to be understood to refer to only an I chart, only an MR chart, only an R chart, or any combination and number of such charts. An I-MR-R chart constitutes an individual visualization of transition analysis outputs, and may aid in interpreting trends in transition analysis data over multiple column runs or lots in the form of NG-HETP, skewness, kurtosis, or other parameters. An advantage of I-MR-R charts is that the data may be quickly viewable, and may be readily interpretable from a visual standpoint. This makes slight trends or an immediate data shift recognizable at an early stage.

An I chart, for example, may plot a value for each analyzed lot (e.g. skewness). An MR chart may plot a value for the difference between a value of each analyzed lot and the previously analyzed lot. An R chart may plot a value for the difference between values within a lot (e.g., skewness for two transition analyses done on one lot for a primary block-and-signal combination and a secondary block-and-signal combination). Each chart may include a mean line, upper control limits (UCL), and lower control limits (LCL), which can be calculated using available data that has been determined to be representative of a typical process, and are placed equidistant from the mean line in each chart.

Some parameters, when plotted on I-MR-R charts, such as NG-HETP and skewness of transition analyses, may depict significant dynamics over the lifetime of certain limits. In such cases, using an I-MR-R chart with control limits estimated using a short-term standard can result in excessive out-of-trend signals, even after resetting the control chart upon repacking of a column. One solution to this issue is the use of a Levey Jennings control chart, which uses long term standard deviation calculations from "representative" column lots that account for special variations attributed to the start-up of a new column pack. Whether data is considered to be representative may be determined by having no anomalous readings for various performance evaluation data sets for a lot. These sets may be used to calculate standard deviation, sometimes with special attention to the +/−3 standard deviation (SD) lines. Several lots may be run on a column to determine whether the majority or entire useful life of the column was "typical." In one aspect, full modeling of viable column dynamics can be performed for a Levey Jennings control chart, which results in a regression model that accounts for the special cause variation of a column repack. A Levey Jennings control chart requires longer term data, however, and thus its use will be limited by the rate of data aggregation.

Additionally, as transition analysis is known to have variation due to column repacking events, I-MR-R charts may take into account packing and repacking of a column— for example, a first lot run after a column is repacked will not have an MR value that is based on a change from the last lot run before the column was repacked. In some aspects, control strategies may be configured to only consider certain violations that exclude known variation due to repacking events when monitoring for trending excursions.

Generating of I-MR-R charts may be performed by, e.g., an analysis module in computing device 110, or in another analysis module elsewhere. Generation of an I-MR-R chart may also be performed in computing device 110 by, e.g., a control chart module. For example, FIGS. 14-21 show I-MR-R data for between 21 and 100 chromatography lots, and are discussed further below.

Referring back to FIG. 6, according to step 660, one or more multivariate statistical analysis methods may also be applied to the I-MR-R data. Alternatively, one or more multivariate statistical analysis methods may be applied to the transition analysis data. This step may be performed in addition to, or as an alternative to, step 650, and like generation of charts according to step 650, takes into account transition analyses of prior chromatography data. Multivariate statistical analysis takes multiple variables and simplifies them to component vectors. This allows for holistic viewing of large sets of data. Advantages include that multiple subtle changes across multiple performances, which would not be evident when looking at singular data sets, may become evident when graphic their component vectors. Fluctuations in this data can be caused by differences in materials, equipment, surrounding atmospheric conditions, and the like, and can be small from the perception of an operator or human observer. Examples of multivariate statistical analysis methods may include Principal Component Analysis (PCA), Partial Least Squares (PLS), Orthogonal Partial Least Squares (OPLS), Multivariate Regression, Canonical Correlation, Factor Analysis, Cluster Analysis, Graphical Procedures, and the like. Such multivariate statistical analyses may be performed using, e.g., specialized computer software.

The general purpose of using multivariate analysis is to transform large amounts of data into interpretable information. By enabling a search for correlations and patterns among multidimensional variables, and extraction of statistically significant values from large amounts of raw data, multivariate analysis enables interpretation of, e.g., any significance to variation between transition analyses of similar lots of chromatography data.

For example, PCA is a multivariate statistical method where a data set containing many variables (e.g., a transition analysis containing several parameters) is reduced to a few variables called Scores (t). For example, a data set containing many variables may be reduced to a data set where each observation (e.g., each transition analysis) is represented by two t-Scores. The t-Scores contain information about the variation of each variable in the data set and the correlation of each variable to every other variable in the data set. As such, t-Scores describe the variation and correlation structure of each observation (e.g., each transitional analysis) in the data set to each other observation in the data set. A graphical output of PCA is commonly a PCA plot. The PCA plot is a plot of one t-Score against another for each observation. Generally, the PCA plot is a distribution showing how the variation and correlation structure compare for all of the observations in the data set. The plot may thus serve to cluster similar observations together.

As another example, a PLS regression analysis is a technique for analysis of systems of independent and response variables. PLS is a predictive technique which can handle many independent variables, even when the variables display multicollinearity. PLS may also relate the set of independent variables to a set of multiple dependent (response) variables. Often, in PLS, one set of latent variables may be extracted for the set of manifest independent variables, and another set of latent variables may be extracted for the set of manifest response (or dependent) variables. This extraction process may be based on decomposition of a cross product matrix involving both the independent and response variables. The scores, or x-values, of the latent independent variables are used to predict the scores, or y-values, of the latent response variables. The predicted y-values are then used to predict additional manifest response variables. The x- and y-scores are selected such that the relationship of successive pairs of x- and y-variables is as strong as possible. The advantages of PLS include an ability to model multiple independent and dependent variables, an ability to handle multicollinearity among independent variables, robustness in the face of data noise and (depending on the software used) missing data, and creating independent latent variables directly on the bases of crossproducts involving response variable(s), making for stronger predictions.

In some embodiments, a multivariate statistical analysis may be performed on an I-MR-R chart, in order to determine further statistical significance of variation shown in an I-MR-R chart.

In addition to the described analyses above, trends in transition analysis can be created by calculating non stationary ranges that allow slow variation to stay within control limits while drastic shifts to column performance may be flagged as potential out of trends. Basic methods of defining control limits include moving average, weighted moving average and various degrees of exponential smoothing. One such method of calculating trend limits that is known as the Holt Winters method, or triple exponential smoothing method can be employed to high effectiveness. The Holt Winters method employs seasonality for prediction of appropriate limits that are defined as a discrete column packing event for direct application to chromatography monitoring. Regression modeling (e.g., used in the Levey Jennings control chart) constitutes an additional way to establish trending limits. Once sufficient empirical data has been obtained, regression modeling of column integrity can be performed with respect to cumulative column pack use. This may provide accurate, appropriate ranges of column performance based on historical column performance included in the model.

Referring back to FIG. 6, according to step 670, an action may be performed based on the performance data. In some embodiments, this can be due to having identified transition analysis as an in-process control (IPC). In general, an action according to step 670 may include generating a report, generating and/or transmitting an alert to an operator or to a display, e.g., a display of computing device 110, or terminating a chromatography process. An action according to step 660 may also include, e.g., storing all of the data acquired during systems and methods disclosed herein in a database, for further analysis.

A result of performing multivariate analysis and/or I-MR-R chart analysis on transition data can be referred to as performance evaluation data. Performance evaluation data can refer to any process data, including transition analysis results, that may have meaning when evaluating the reproducibility and success of a process (e.g., a chromatography process).

In one aspect, step 670 may include generating one or more reports. For example, the methods and systems disclosed can generate reports in tabular format, of any results analyzed using a given profile. Reports can be generated based on a desired number of previous lots, for a specific time frame, and/or for specific lots. The data sets can be fully extractable into multiple formats and can be input into external applications if further analysis is desired.

FIG. 24 depicts an exemplary report 2400 according to some aspects of the present disclosure. The exemplary report 2400 includes a Report Pivot Table, that includes the results of four chromatography cycles from one manufacturing lot. Each of the four cycles is listed by its lot and cycle number, and includes a listing of the date and time at which it was run. Transition analysis results are reported in columns, including NG-HETP, Gaussian HETP, skewness, asymmetry, kurtosis, Non-Gaussian N, and Gaussian N. A snapshot of the data source is also provided, indicating the name of the chromatography system from which the data came, the logbook in which it was recorded, and the blocks for which data was taken. Below the data for each of the cycles, trending data for each of the analysis results is reported. It is to be understood that this report is an exemplary report, and many variations are possible. For example, a desired number of chromatography cycles may be listed and/or included in one or more plots of trending data.

In some aspects, systems and methods disclosed here may be used for continuous monitoring of column and process integrity. As such, the systems and methods disclosed herein can analyze data with respect to a specific column and/or process. In an aspect, one or more alerts can be generated based on the data analysis. In another aspect, the chromatography process can be terminated based on the data analysis. For example, one or more notifications (e.g., a notification of event, evaluation of event, or deviation notification form) can be provided to or displayed to an operator to take corrective action. For example, one or more screen overlays can be displayed on, e.g., a screen of computing device 110, and/or a message may be sent to an operator at the time of analysis completion, advising on whether to continue or stop a chromatography process.

In an aspect, results from the disclosed methods and systems can be trended to impart information of the current trends in assessing column packing quality prior to column use in manufacturing. In another aspect, results from the disclosed methods and systems can be used to evaluate column performance in real-time (or offline) and can confirm that column integrity prior to the next product use cycle (e.g., if acceptable range and control limits in a trend chart are established).

In a further aspect, results can be used with statistical information to predict process outcomes based on process modeling using multivariate statistical analysis, prior to expensive and time-consuming investigation and testing.

One evaluation criterion for statistical analyses plots in particular, for example, may include that, upon generating a score plot for a data set using PCA, a lot that is beyond a threshold number of standard deviations from a mean may be identified as a column integrity issue, and may cause the generation of an alert or instruction as to lot variation.

One evaluation criterion for I-MR-R charts in particular may include that any points outside of upper or lower control limits for one or multiple chart types may be a basis for an alert. Thus, the action performed according to step 670 may be to issue an alert, e.g., from computing device 110, if a lot shows points outside of control limits. Such alerts may include, for example, a notification of event, an evaluation of event, and/or a deviation notification form, to be provided to an operator or a database.

In some aspects, systems and methods disclosed herein may be implemented as a part of an in-process control system, which may operate within the framework of an organization's quality system to ensure consistency and adherence to safety requirements. As a part of such a program, data from the systems and methods disclosed herein may be used to determine critical process parameters (CPP) and critical quality attributes (CQA) to be monitored in an in-process control program. Additionally, as a part of such a program, signal transition and column integrity shifts may be detected in real-time or close to real-time (e.g., while, or concurrently with, the running of a column), allowing preventative and corrective actions to be taken in response to performance data.

FIG. 23 depicts an exemplary user interface 2300 according to some aspects of the present disclosure. User interface 2300 depicts a transition analysis profile creation/editing screen with which a user may generate or edit a new transition analysis profile. The parameters selected during creation of a profile can be used to adjust a transition analysis, based on the unique characteristics of a chromatography process and to optimize robustness of the output for each column and program. Parameters listed in exemplary user interface 2300 include, for example, a profile name, comments, historical data and/or test location, a file pattern, a final value, a key indicator, a hard reset, a window size for a moving average, values for a first filter (e.g., an SG filter), values for a second filter, a percentage of Vmax first under which the signal should be registered as zero, percentage of max width to retain a peak, a height of the chromatography column, a start date, an end date, and a database name.

Methods and systems disclosed herein may be used for relatively continuous monitoring of column integrity. For example, methods and systems disclosed herein may monitor column integrity without requiring interruption of regular chromatography processes to perform diagnostics on a chromatography system. Moreover, methods and systems disclosed herein can analyze data with respect to a specific column and a specific process. As discussed, one or more alerts may be generated based on data analysis over time. In another aspect, a chromatography process may be terminated based on the data analysis. For example, one or more notifications can be displayed to an operator to take corrective action in the event that column integrity is found to be compromised. For example, one or more screen overlays can be displayed and a message window can be displayed to an operator at the time of an analysis completion, advising on continuing or stopping a chromatography process, or advising on other actions.

In some aspects, results from disclosed methods and systems can be trended to impart information on current trends in assessing column packing quality prior to column use in manufacturing. In other aspects, results from the disclosed methods and systems can be used to evaluate column performance in real-time (or offline) and can confirm that column integrity prior to the next product use cycle (e.g., if acceptable range and control limits in a trend chart are established). In some aspects, results can be used with statistical information to predict process outcomes based on process modeling using MVA prior to expensive and time-consuming investigation and testing.

EXAMPLES

Example 1

A primary block-and-signal combination is chosen from affinity capture chromatography data of a Protein A as follows. The affinity capture data includes eight blocks and two signals (UV and conductivity) in each block, for a total of 16 potential block-and-signal combination choices. A profile is assigned to the data, containing a series of block-and-signal selection criteria, which are applied in the following order to choose a primary block-and-signal combination:

By considering the selection criteria that blocks must occur at regular intervals among manufacturing batch cycles, two blocks and their respective signals can be eliminated, leaving 12 potential combination choices.

By considering the selection criteria that the signal must reach UV absorbance meter saturation, the UV signal for three blocks can be removed as candidates, leaving nine potential combination choices.

By considering the selection criteria that signals approach a stationary phase at a distinct and identifiable level, the UV signal for three blocks can be removed as candidates, leaving six potential combination choices (all with conductivity as the signal choice).

By considering the selection criteria that signals should have a large difference between minimum and maximum values at a given block, conductivity for four blocks can be removed, leaving two potential combination choices.

By considering the selection criteria that the signals displaying the least number of inflection points are preferable, conductivity for one block can be removed, leaving only one block-and-signal combination choice remaining.

The final remaining block and conductivity signal choice is the primary block-and-signal combination on which transition analysis may be performed. The last block-and-signal combination to be eliminated becomes the secondary block-and-signal combination.

Example 2

Figure 14:
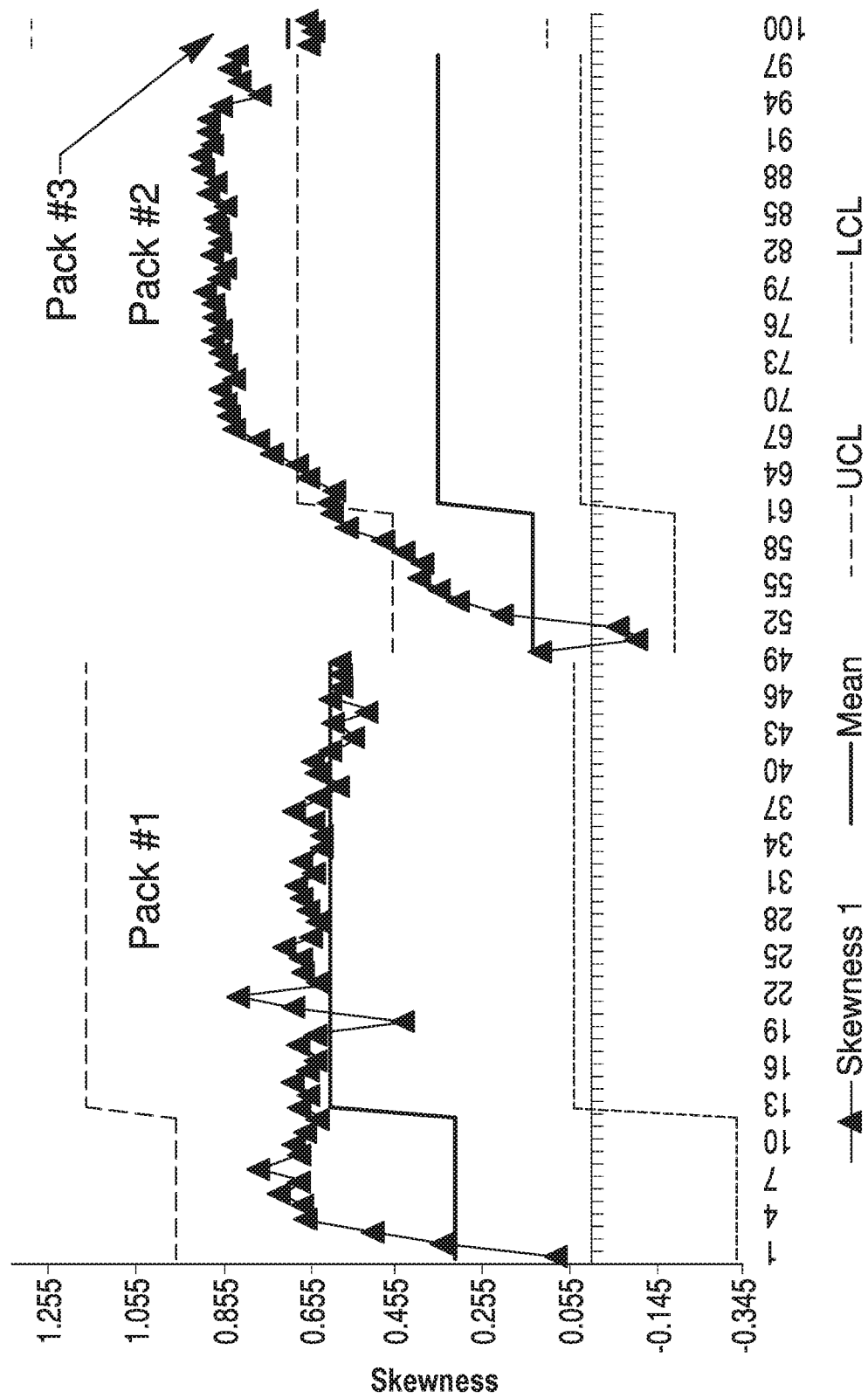
FIG. 14 depicts an Individual chart for skewness at a given chromatography unit operation, according to some aspects of the present disclosure.
Figure 15:
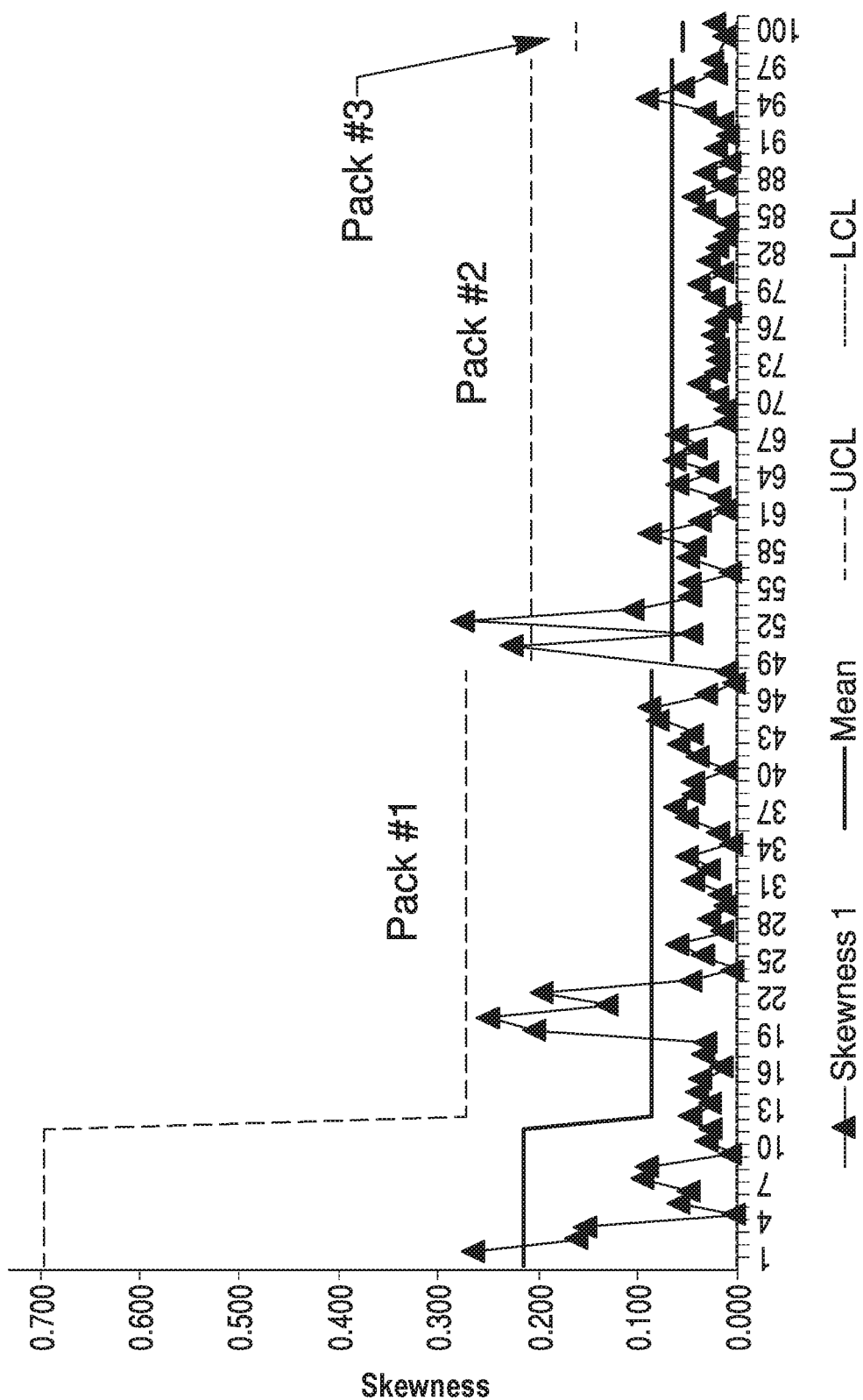
FIG. 15 depicts a Moving Range chart for skewness at a given chromatography unit operation, according to some aspects of the present disclosure.
Figure 16:
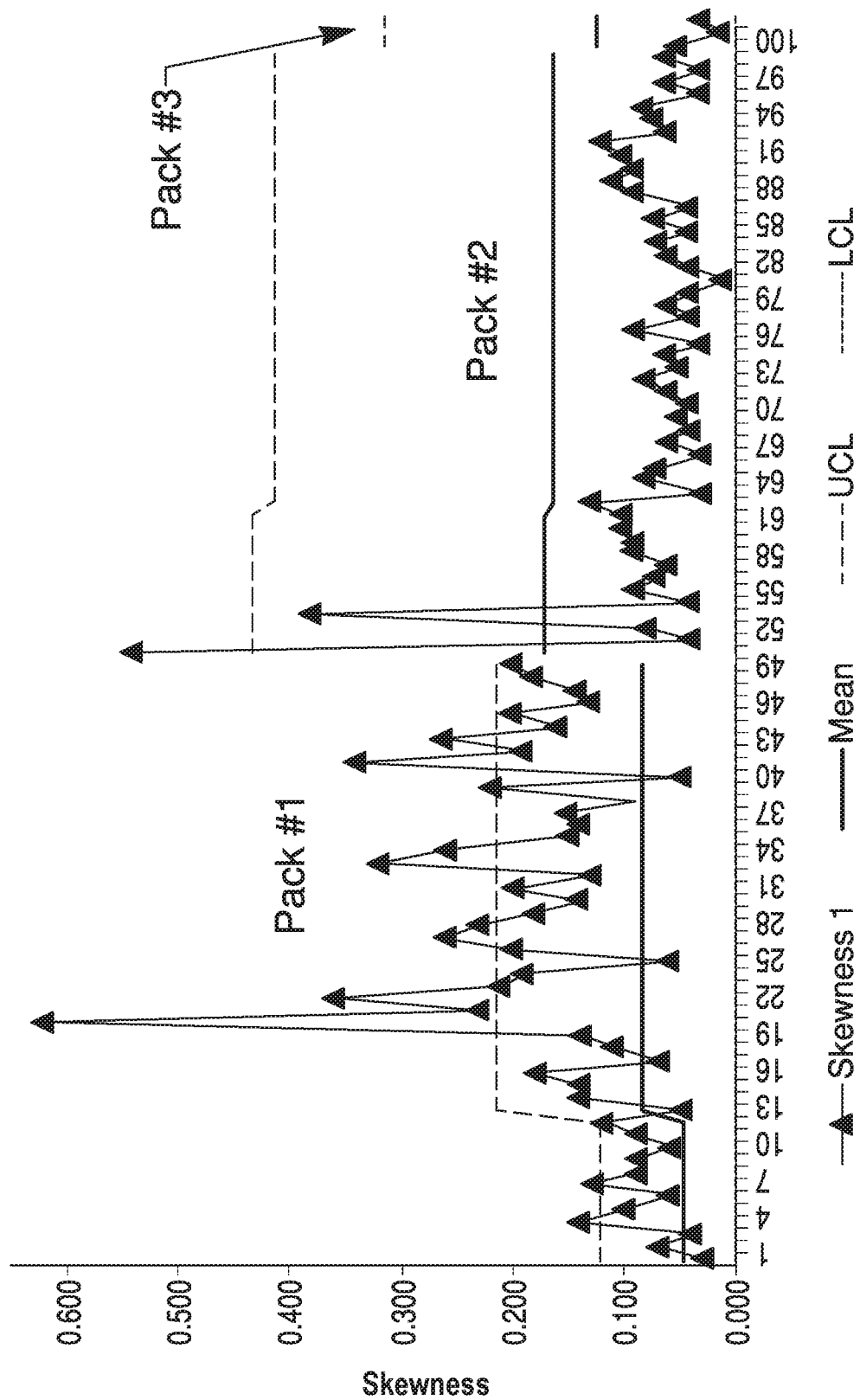
FIG. 16 depicts a Range chart for skewness at a given chromatography unit operation, according to some aspects of the present disclosure.
Figure 17:
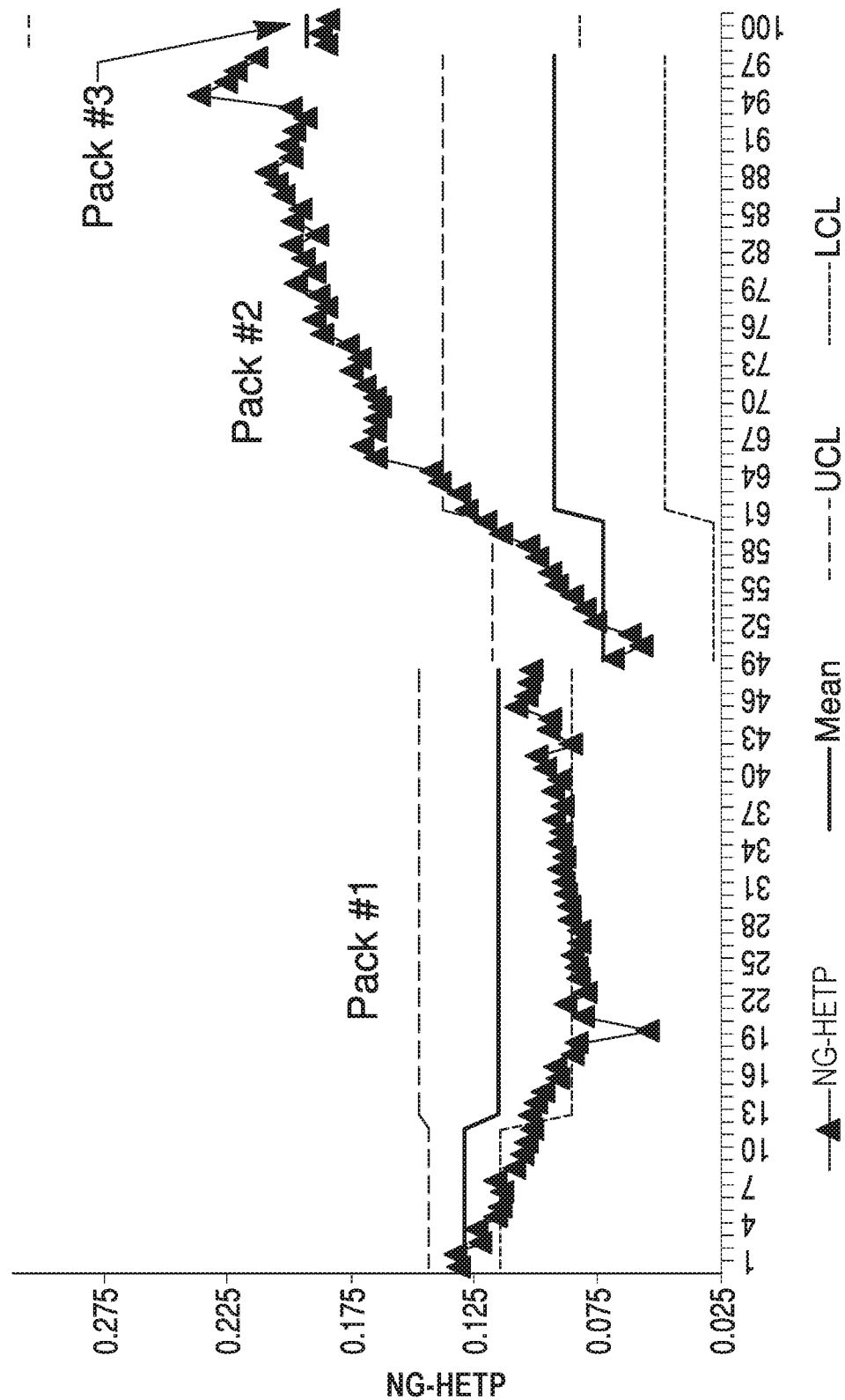
FIG. 17 depicts an Individual chart for non-Gaussian HETP (NG-HETP) according to some aspects of the present disclosure.
Figure 18:
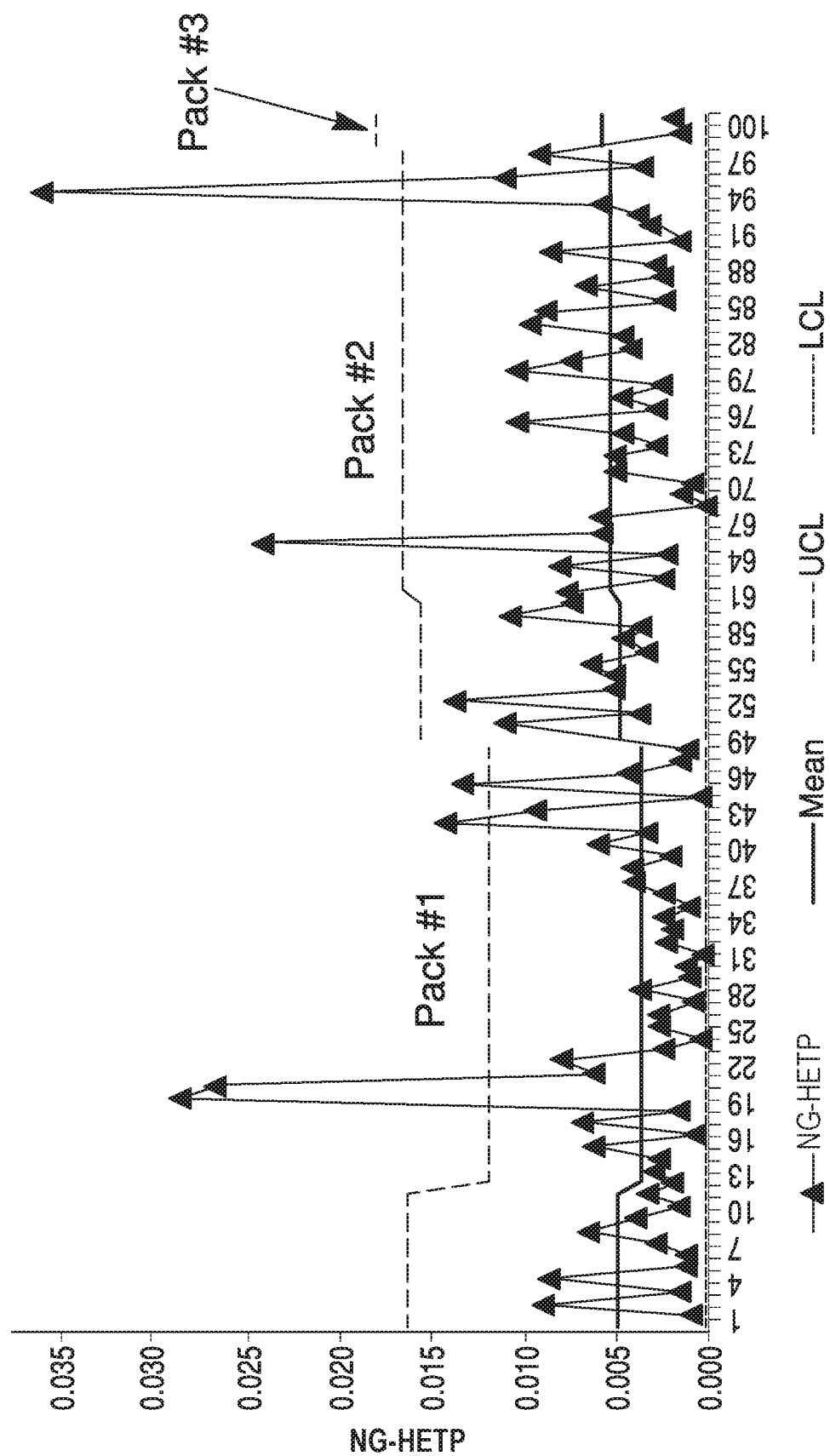
FIG. 18 depicts a Moving Range chart for NG-HETP, according to some aspects of the present disclosure.
Figure 19:
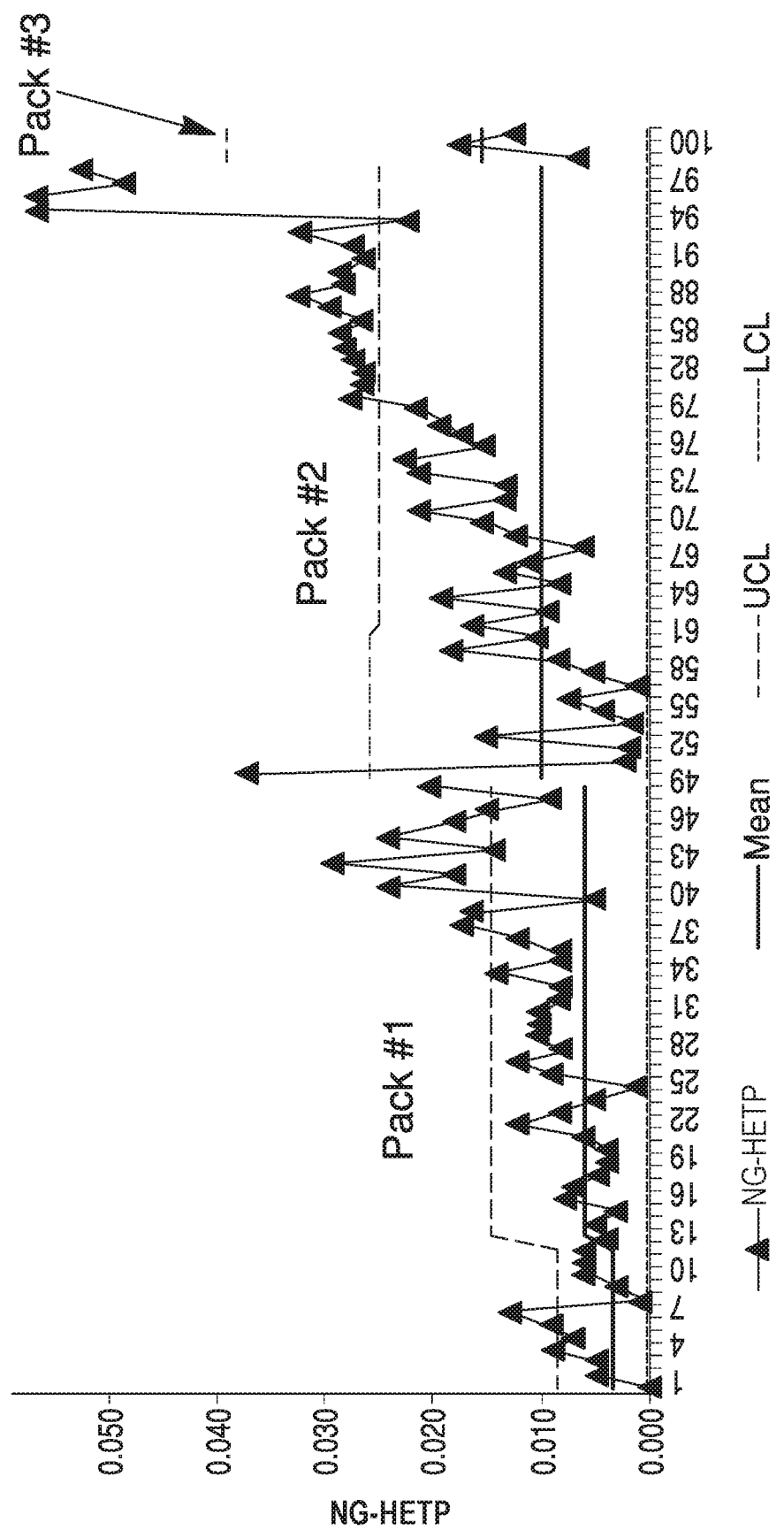
FIG. 19 depicts a Range chart for NG-HETP, according to some aspects of the present disclosure.

I-MR-R trending skewness and NG-HETP data was plotted for 100 chromatography lots in a given chromatography "Program B" as follows. FIGS. 14-16 illustrate the I, MR, and R charts, respectively, showing skewness. FIGS. 17-19 illustrate the I, MR, and R charts, respectively, showing NG-HETP. The UCL and LCL indicate 3 standard deviations, as determined by previously accepted data. Breaks in the mean, UCL, and LCL lines indicate a column repacking. Unbroken shifts in these lines indicate a point where the limits were recalculated.

FIG. 14 illustrates the skewness for all 100 lots produced in Program B. It can be seen that the first and second column packs exhibit different behavior during their use. As shown, Pack 1 experiences a shift in limits after the first four lots, and maintains skewness values between 0.055 and 0.855. Pack 2 is out of trend, but eventually reaches a stead state at lot number 67. This may be due to shifting and settling of the new column pack taking longer than in Pack 1.

FIG. 15 illustrates an MR Chart for skewness for all lots produced in Program B. Outliers can be observed for Pack 2 indicating large shifts between lots based on individual values.

FIG. 16 illustrates an R Chart for the skewness for all lots produced in Program B. Several outliers are noted in Pack 1. This increased the limits for Pack 2. There are three packs on the chart and lots are charted sequentially such that Pack 1 is the leftmost continuous line and Pack 3 is the rightmost continuous line. Note that trending points are out during the second half of Pack 1. This may indicate that the column was experiencing variability within the cycles of the lots.

FIG. 17 illustrates an I Chart for NG-HETP for all lots produced in Program B. Pack 1 experiences decreasing NG-HETP, indicative of improving column behavior. Pack 2 experienced continual increases in NG-HETP which may have correlated with reduced column efficacy.

FIG. 18 illustrates a Moving Range Chart for the NG-HETP for all lots produced in Program B. Outliers can be noticed in both Pack 1 and 2. This identified several points that show dramatic shifts from individual to individual values.

FIG. 19 illustrates an R Chart for the NG-HETP for all lots produced in Program B. Pack 2 shows consistently elevated range values which were investigated and determined to have a root cause of varying flow direction within the third cycle of the lot. This caused the third cycle to demonstrate a different value than the other cycles Example 3

Individual (I) charts were plotted for transition analyses of two groups of chromatography lots for a given "Program A."

Figure 20:
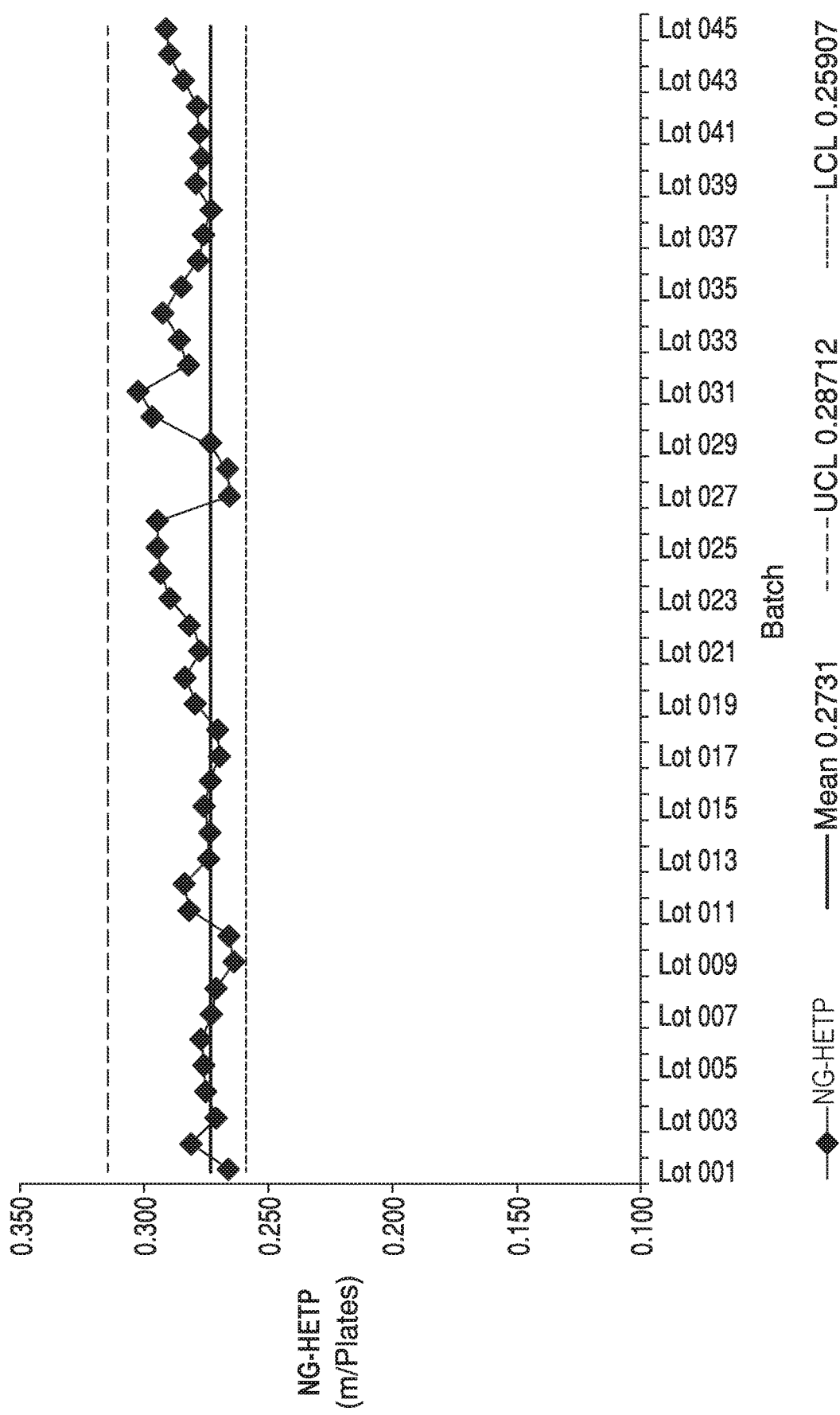
FIG. 20 depicts another Individual chart for NG-HETP, according to some aspects of the present disclosure.

FIG. 20 illustrates an I chart for the NG-HETP for 46 lots produced in Program A. The data shows that the column is performed within established limits for process consistency.

Figure 21:
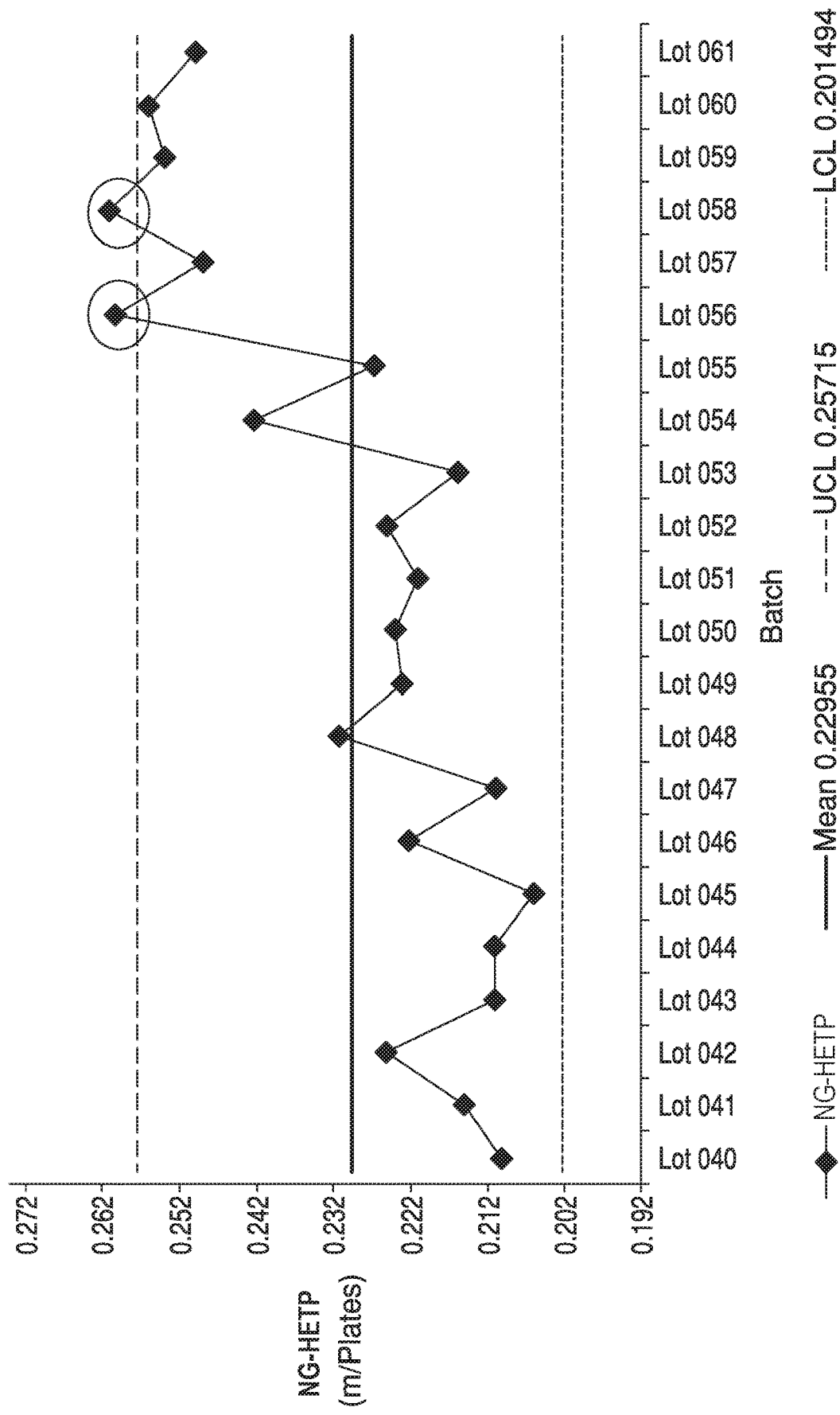
FIG. 21 depicts yet another Individual chart for NG-HETP, according to some aspects of the present disclosure.

FIG. 21 illustrates an I chart for the NG-HETP for 21 additional lots produced in Program A. The data shows that two lots (56 and 58) exceeded upper control limits.

Example 4

Figure 10:
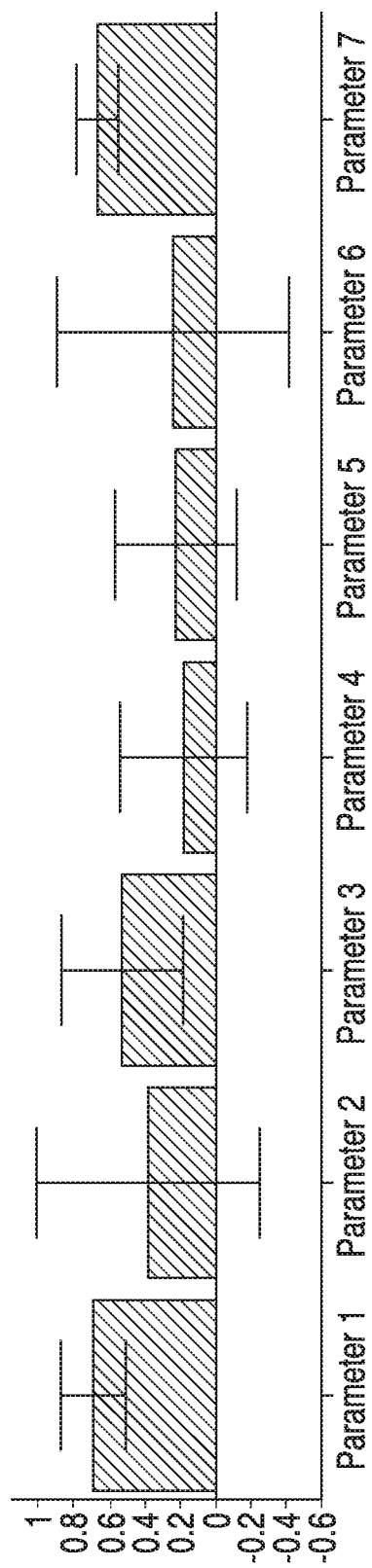
FIG. 10 depicts a loading plot of each variable in a principal component from 27 lots, according to some aspects of the present disclosure.

A multivariate analysis was performed using transition analysis data from 27 chromatography lots, including the three lots depicted in FIG. 4. Loading values were calculated for seven parameters from the 27 lots, including the three lots depicted in FIG. 4. The seven parameters included NG-HETP for each of an I chart, an MR chart, and an R chart for the lots, skewness for each of the I chart, MR chart, and R chart for the lots, and kurtosis for the I chart. FIG. 10 shows a loading chart of each of seven parameters. The magnitude of each of the bars corresponds to the parameter's effect on the principal component. Error bars indicate the relative error in the loading value.

Figure 11:
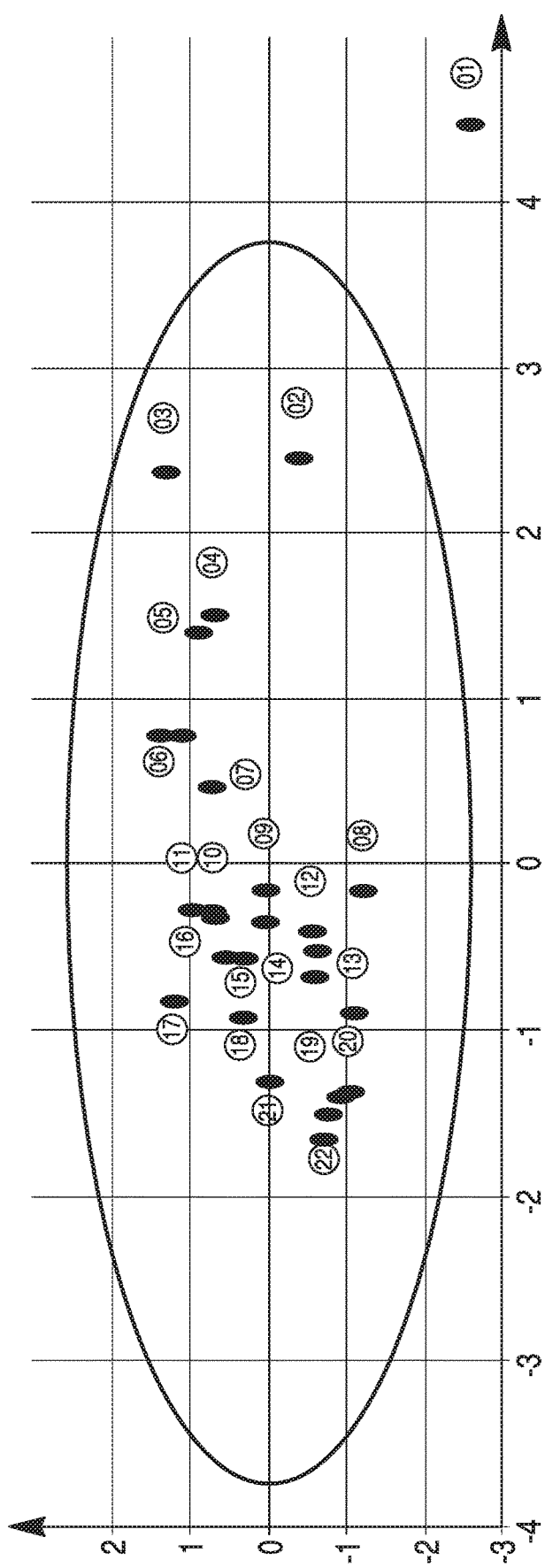
FIG. 11 depicts an exemplary score plot from 27 lots, according to some aspects of the present disclosure.

FIG. 11 illustrates an exemplary score plot of the 27 lots. The score plot was calculated for the seven parameters from 27 lots, including the loading values calculated for the lots depicted in FIG. 4 (principal component 1) as well as principal component 2. Lots with similar parameter values were clustered. The ellipse around the majority of the plot points excludes outliers with 95% confidence.

Example 5

A multivariate analysis was performed on I-MR-R data for transition analysis of 46 chromatography lots as follows. I-MR-R data was collected for each of the 46 lots. Lots that were deemed atypical or unsuitable based on the I-MR-R data were removed from the analysis and data for the remaining lots were collected into Table 1 below. Lots containing values for multiple transitions were averaged and reported as individual measurements. Range values were calculated as the maximum values minus minimum values of transitions within a lot.

TABLE 1

| Lot ID | Individual NG-HETP | Individual Skewness | NG-HETP Range | Skewness Range |
|---|---|---|---|---|
| 1 | 0.0824 | 0.73 | 0.01 | 0.09 |
| 2 | 0.0951667 | 0.84 | 0.007 | 0.07 |
| 3 | 0.0994 | 0.826 | 0.007 | 0.07 |
| 4 | 0.206167 | −0.263333 | 0.204 | 1.62 |
| 5 | 0.96625 | 0.135 | 2.037 | 1.75 |
| 6 | 1.91875 | −0.10625 | 3.622 | 1.83 |
| 7 | 0.107 | 0.925 | 0.015 | 0.06 |
| 8 | 0.55075 | 0.25625 | 3.355 | 2.16 |
| 9 | 0.738625 | −0.06375 | 3.418 | 2.32 |
| 10 | 0.565714 | −0.05 | 1.302 | 2.72 |
| 11 | 0.107667 | 0.715 | 0.012 | 0.14 |
| 12 | 0.0745714 | 0.595714 | 0.009 | 0.11 |
| 13 | 0.0651429 | 0.56 | 0.006 | 0.07 |
| 14 | 0.0575714 | 0.472857 | 0.002 | 0.07 |
| 15 | 0.0575714 | 0.5 | 0.007 | 0.17 |
| 16 | 0.054 | 0.395714 | 0.008 | 0.16 |
| 17 | 0.0701429 | 0.302857 | 0.115 | 0.77 |
| 18 | 0.0628571 | 0.545714 | 0.019 | 0.26 |
| 19 | 0.0702857 | 0.452857 | 0.018 | 0.47 |
| 20 | 0.0671429 | 0.491429 | 0.033 | 0.45 |
| 21 | 0.111429 | 0.172857 | 0.06 | 1.19 |
| 22 | 0.167429 | −0.101429 | 0.163 | 1.41 |
| 27 | 0.1274 | 0.544 | 0.009 | 0.08 |
| 28 | 0.131833 | 0.575 | 0.009 | 0.06 |
| 29 | 0.136667 | 0.605 | 0.009 | 0.05 |
| 31 | 0.133833 | 0.6 | 0.011 | 0.04 |
| 32 | 0.134833 | 0.595 | 0.005 | 0.03 |
| 33 | 0.1368 | 0.626 | 0.003 | 0.04 |
| 34 | 0.135 | 0.613333 | 0.003 | 0.06 |
| 35 | 0.1344 | 0.632 | 0.005 | 0.05 |
| 41 | 0.137667 | 0.638333 | 0.014 | 0.07 |
| 42 | 0.134833 | 0.62 | 0.007 | 0.05 |
| 43 | 0.1352 | 0.642 | 0.004 | 0.03 |
| 44 | 0.1316 | 0.638 | 0.008 | 0.07 |
| 45 | 0.131833 | 0.641667 | 0.003 | 0.07 |
| 46 | 0.135167 | 0.675 | 0.009 | 0.03 |

Using the data from Table 1, a principal component was calculated by creating loading plots showing coefficients for each input parameter. Each row of data was transformed to a single value. Assessment of model accuracy and relevancy to the physical system was indicated by $R^2$ and $Q^2$ values of the PCA model, where $R^2$ is a statistical measure of how close a test set of data are to the fitted regression line, and $Q^2$ is a statistical measure of how close a test set of data would be to the regression line. Together, $R^2$ and $Q^2$ indicate how well a model describes the system being analyzed, with 1 being perfect modeling and 0 representing a complete lack of correlation.

Figure 12:
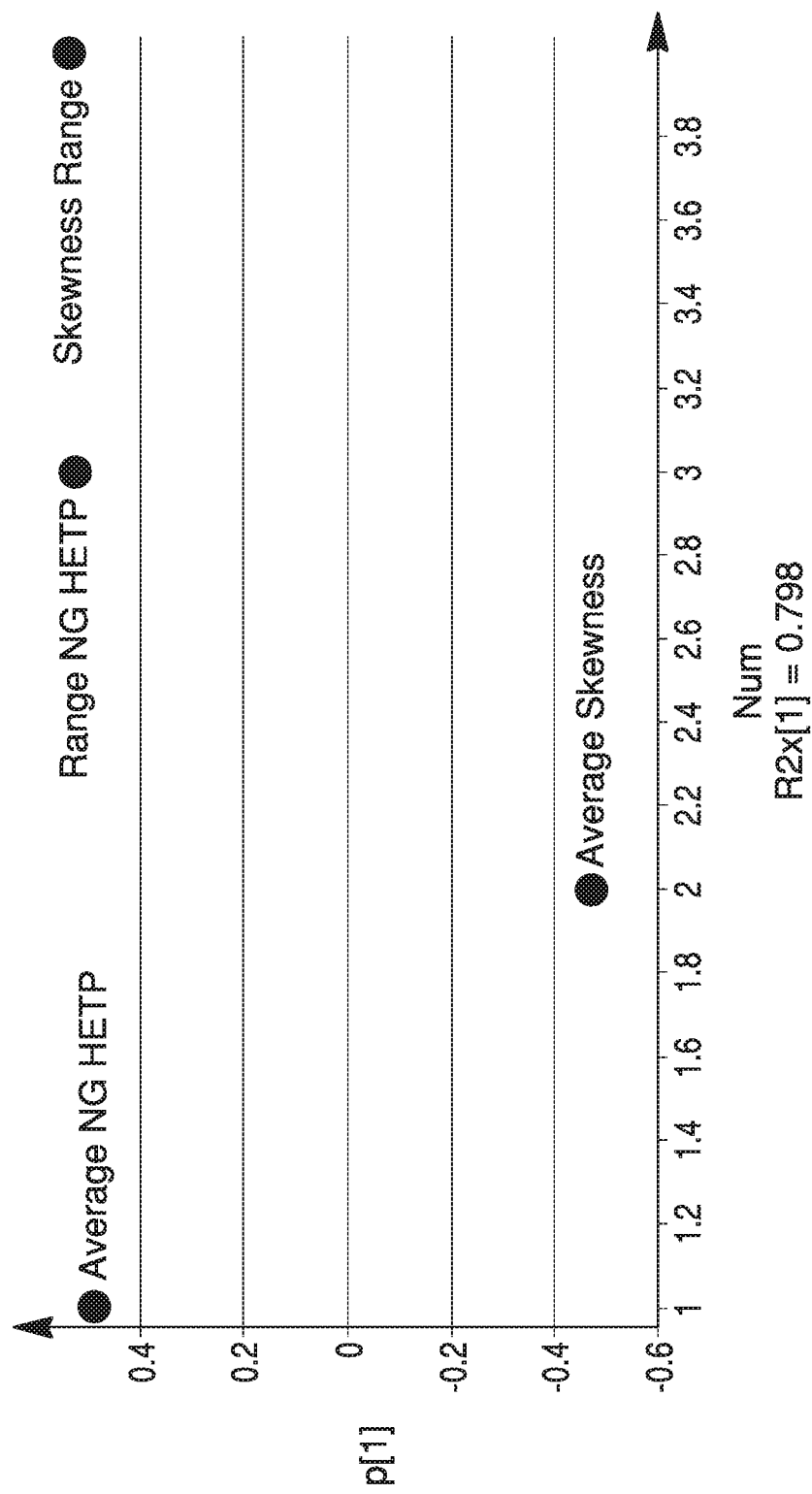
FIG. 12 depicts an exemplary loading plot of a multivariate model, according to some aspects of the present disclosure.

FIG. 12 shows a loading plot of the model. The $R^2$ value for the model was 0.798, and the $Q^2$ value was 0.591, indicating the model was acceptable for use and that all input values had effects on the model principal component, because they are not located near the center line. In FIG. 12, the magnitude of the y-coordinate of each point corresponds to a parameter's effect (e.g., the effect of average NG-HETP, range of NG-HETP, skewness range, and average skewness) on the principal component. The y coordinate of each point corresponds to the number of inputs per point.

Figure 13:
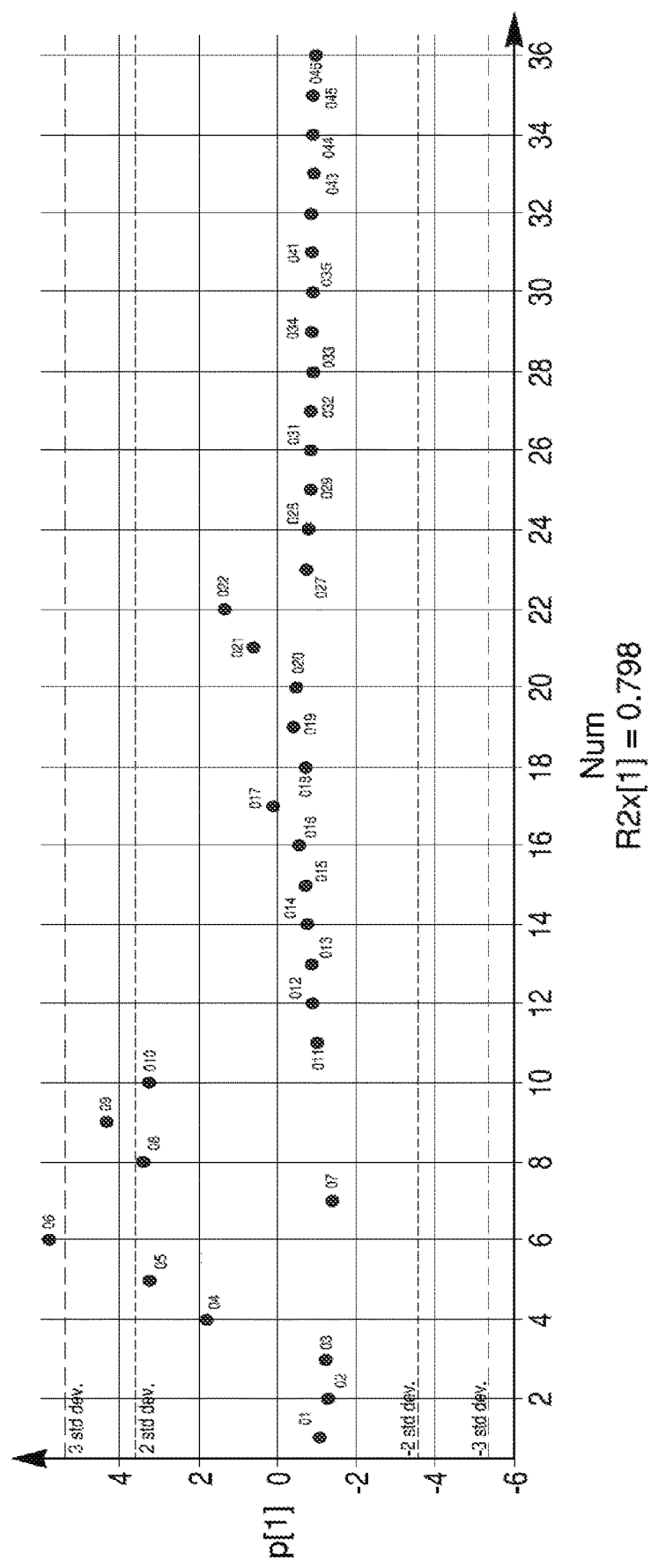
FIG. 13 depicts an exemplary score plot, according to some aspects of the present disclosure.

Principal component values were trended and graphed linearly with respect to corresponding lots. FIG. 13 depicts a score plot for the data set. The score plot shows the PC1 value (the value contributed to the direction of highest variance) for each lot used. It can be seen in FIG. 13 that one lot (Lot 6) was outside a three-standard deviation limit, and that several points were close to exceeding two standard deviations, indicating that the system was experiencing variation in those lots.

As will be appreciated by one of ordinary skill in the art, the methods and systems disclosed herein may take the form of entirely hardware embodiments, entirely software embodiments, or embodiments combining software and hardware aspects. Furthermore, systems and methods according to the present disclosure may take the form of computer program products on a computer-readable storage medium having computer-readable instructions (e.g., computer software) embodied in the storage medium. Suitable computer-readable storage media may include hard disks, CD-ROMs, optical storage devices, or magnetic storage devices. More particularly, the present methods and systems may take the form of web-implemented computer software.

Embodiments of the present disclosure are described with reference to block diagrams and flowchart illustrations of methods, systems, apparatuses, and computer program products. It will be understood that one or more blocks of the block diagrams and flowchart illustrations, respectively, can be implanted by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instructions for performing the specified functions. It will also be understood that each block of the block diagrams and flowchart illustrations, and combinations of blocks in the block diagrams and flowchart illustrations, can be implemented by hardware-based computer systems that perform the specified functions or steps, or combinations of hardware (e.g., special-purpose chromatography hardware) and computer instructions.

Figure 22:
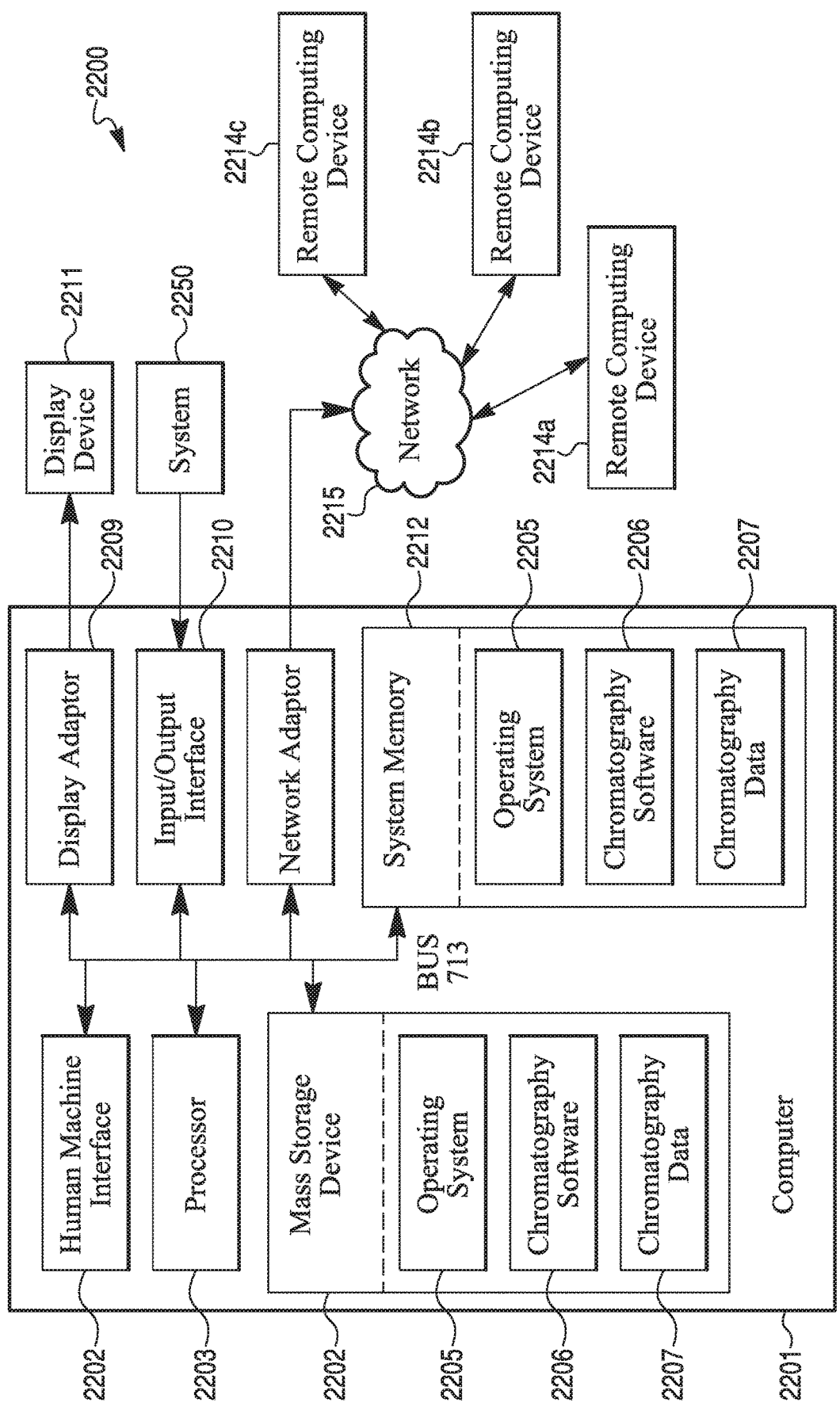
FIG. 22 depicts an exemplary system on which aspects of the present disclosure may be implemented.

FIG. 22 depicts an operating environment 2200 in which some systems and methods according to the present disclosure may be implemented. By way of example, process controller 108 and computer device 110 (or a component thereof) of FIG. 1 could be a computer 2201, as illustrated in FIG. 22. Computer 2201 can comprise one or more components, such as one or more processors 2203, a system memory 2212, and a bus 2213 that couples various components of a computer 2201 including the one or more processors 2203 to the system memory 2212. In the case of multiple processor 2203, the system can use parallel computing.

The bus 2213 can comprise one or more of several possible types of bus structures, such as a memory bus, memory controller, a peripheral bus, an accelerated graphics port, and a processor or local bus using any of a variety of bus architectures. The bus 2213, and all buses specified in this description can also be implemented over a wired or wireless network connection.

The computer 2201 typically comprises a variety of computer readable media. Exemplary readable media can be any available media that is accessible by the computer 2201 and comprises, for example and not meant to be limiting, both volatile and non-volatile media, removable and non-removable media. The system memory 2212 can comprise computer readable media in the form of volatile memory, such as random access memory (RAM), and/or non-volatile memory, such as read only memory (ROM). The system memory 2212 typically can comprise data such as chromatography data 2207 and/or program modules such as operating system 2205 and chromatography software 2206 that are accessible to and/or are operated on by the one or more processors 2203. The many features and advantages of the present disclosure are apparent from the detailed specification, and thus, it is intended by the appended claims to cover all such features and advantages of the present disclosure that fall within the true spirit and scope of the disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

In another aspect, the computer 2201 can also comprise other removable/non-removable, volatile/non-volatile computer storage media. The mass storage device 2204 can provide non-volatile storage of computer code, computer readable instructions, data structures, program modules, and other data for the computer 2201. For example, a mass storage device 2204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. A process control method, comprising:
receiving raw chromatography data including a plurality of signals and a plurality of blocks;
processing the raw chromatography data by selecting a combination of a first block and a first signal from the raw chromatography data;
performing a transition analysis on the processed raw chromatography data, wherein performing the transition analysis includes:
generating performance parameters, the performance parameters including a maximum rate of change or a number of inflection points; and
based on the performance parameters, generating the transition data;
generating an Individual chart, a Moving Range chart, or a Range chart based on the transition data; and
generating performance data by applying a statistical process control to the Individual chart, Moving Range chart, or Range chart.

2. The process of claim 1, further comprising performing an action based on the performance data, wherein the action comprises at least one of:
generating a notification of an event;
generating an evaluation of the event; or
generating a deviation notification form.

3. The method of claim 1, further comprising performing a chromatography column run and generating raw chromatography data from the chromatography column run;
wherein the raw chromatography data is used to generate the processed chromatography data.

4. The method of claim 3, wherein the raw chromatography data includes a plurality of signals, and each signal of the plurality of signals is associated with one of a plurality of blocks, and
wherein each block of the plurality of blocks corresponds to a step in the chromatography column run.

5. The method of claim 3, further comprising:
generating smoothed data by applying a noise reduction technique to a selection of the raw chromatography data, wherein the noise reduction technique increases a signal-to-noise ratio of the selection of the raw chromatography data.

6. The method of claim 5, further comprising:
generating the processed chromatography data by selecting smoothed data matching a feature of a chromatogram transition.

7. The method of claim 5, wherein performing the noise reduction technique includes:
selecting a portion of the raw chromatography data to analyze using predetermined set points;
using at least one smoothing filter on the selected portion of data to generate smoothed data;
normalizing the selected portion of data to prevent magnitude bias; and
analyzing the selected portion of data for dynamic signal errors.

8. The method of claim 1, wherein the transition analysis further includes:
generating a curve using the processed chromatography data; and
analyzing the curve to generate performances parameters.

9. A process control method, comprising:
receiving a selection of raw chromatography data;
generating smoothed data by applying a noise reduction technique to the selection of raw chromatography data, wherein the noise reduction technique comprises:
selecting a portion of the raw chromatography data to analyze using predetermined set points; and
using at least one smoothing filter on the selected portion of data to generate smoothed data;
generating processed chromatography data by selecting smoothed data matching a feature of a chromatogram transition, wherein the feature of the chromatogram transition includes:
a derivative duration;
a maximum intensity;
a duration from initiation; or
expected background noise; and
using the processed chromatography data to generate one of an Individual chart, a Moving Range chart, or a Range chart.

10. The method of claim 9, wherein the noise reduction technique further comprises:
normalizing the portion of raw chromatography data to prevent magnitude bias;
analyzing the portion of raw chromatography data for dynamic signal errors; or
both.

11. The method of claim 9, further comprising:
generating performance data by applying a statistical process control to the Individual chart, Moving Range chart, or Range chart by:
performing a multivariate data analysis; or
performing a principal component analysis.

12. The method of claim 11, further comprising:
performing an action based on the performance data, wherein the action comprises at least one of:
generating a notification of an event;
generating an evaluation of the event; or
generating a deviation notification form.

13. The method of claim 9, wherein the selection of raw chromatography data is received from a chromatography process skid.

14. The method of claim 9, further comprising:
performing a transition analysis on the processed chromatography data to generate transition data, wherein performing the transition analysis includes:
generating performance parameters, the performance parameters including a maximum rate of change or a number of inflection points; and
based on the performance parameters, generating the transition data; and
performing an action based on the transition data, wherein performing the action includes generating a notification of an event, generating an evaluation of the event, or generating a deviation notification form.

15. The method of claim 9, further comprising:
performing a transition analysis to generate transition data, wherein performing a transition analysis includes:
generating a curve using the processed chromatography data;
analyzing the curve to generate performance parameters; and
based on the performance parameters, generating the transition data; and
performing an action based on the transition data, wherein performing the action includes generating a notification of an event, generating an evaluation of the event, or generating a deviation notification form.

16. A process control method, comprising:
receiving raw chromatography data including a plurality of signals, wherein each signal of the plurality of signals is associated with one of a plurality of blocks;

generating processed chromatography data by applying a noise reduction technique to a subset of the raw chromatography data, wherein applying the noise reduction technique includes:
    selecting a portion of the subset of the raw chromatography data to analyze using predetermined set points; and
    using at least one smoothing filter on the portion to generate smoothed data;

generating performance parameters, the performance parameters including a maximum rate of change or a number of inflection points;

based on the performance parameters, generating the transition data; and performing an action based on the transition data, wherein performing the action includes generating a notification of an event, generating an evaluation of the event, or generating a deviation notification form.

17. The method of claim 16, further comprising:
performing a chromatography column run, wherein the raw chromatography data is received from the chromatography column run.

18. The method of claim 16, wherein each block of the plurality of blocks corresponds to a step in a chromatography process.

19. The method of claim 16, further comprising:
selecting the combination of the first block and the first signal according to a profile defining a plurality of selection criteria, wherein the plurality of selection criteria comprises:
    whether blocks occur at regular chromatography cycle intervals;
    an extent to which one of the plurality of signals saturates a detector;
    an extent to which the plurality of signals approaches a stationary phase at a distinct level;
    a magnitude of variation in the plurality of signals; or
    a number of inflection points shown by the plurality of signals during a transition phase, and
wherein the subset of data is obtained from the combination of the first block and the first signal.

20. The method of claim 16, further comprising:
generating an Individual chart, a Moving Range chart, or a Range chart based on the transition data; and
generating performance data by applying a statistical process control to the Individual chart, Moving Range chart, or Range chart,
wherein performing the action based on the transition data includes performing the action based on the performance data.

* * * * *

UNITED STATES PATENT AND TRADEMARK OFFICE
CERTIFICATE OF CORRECTION

PATENT NO. : 11,333,642 B2
APPLICATION NO. : 16/797548
DATED : May 17, 2022
INVENTOR(S) : Nathan L. Mao et al.

It is certified that error appears in the above-identified patent and that said Letters Patent is hereby corrected as shown below:

On the Title Page

In Item (73):
Delete "Regeneran" and insert --Regeneron--.

In the Claims

In Claim 2, Column 27, Line 21:
Delete "process" and insert --method--.

Signed and Sealed this
Eleventh Day of October, 2022

Katherine Kelly Vidal
*Director of the United States Patent and Trademark Office*